United States Patent
Yamada et al.

(10) Patent No.: US 9,014,462 B2
(45) Date of Patent: Apr. 21, 2015

(54) DEPTH INFORMATION GENERATING DEVICE, DEPTH INFORMATION GENERATING METHOD, AND STEREO IMAGE CONVERTER

(75) Inventors: Hitoshi Yamada, Osaka (JP); Thanaphat Thummanuntawat, Singapore (SG); Pongsak Lasang, Singapore (SG); Sheng Mei Shen, Singapore (SG)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 231 days.

(21) Appl. No.: 13/520,654

(22) PCT Filed: Nov. 9, 2011

(86) PCT No.: PCT/JP2011/006257
§ 371 (c)(1),
(2), (4) Date: Jul. 5, 2012

(87) PCT Pub. No.: WO2012/063480
PCT Pub. Date: May 18, 2012

(65) Prior Publication Data
US 2012/0274634 A1    Nov. 1, 2012

(30) Foreign Application Priority Data
Nov. 10, 2010  (JP) ................. 2010-252261

(51) Int. Cl.
G06K 9/00  (2006.01)
G06T 7/00  (2006.01)
(52) U.S. Cl.
CPC ............. *G06T 7/0081* (2013.01); *G06T 7/0051* (2013.01); *G06T 2207/10024* (2013.01); *G06T 2207/30201* (2013.01); *G06K 9/00362* (2013.01)

(58) Field of Classification Search
CPC ............... G06T 7/0081; G06T 7/0051; G06T 2207/10024; G06T 2207/30201; G06K 9/00362
USPC ....................... 382/154; 345/419, 427; 356/12
See application file for complete search history.

(56) References Cited

U.S. PATENT DOCUMENTS 6,131,011 A * 10/2000 Kojima et al. ................. 399/351
6,658,136 B1 * 12/2003 Brumitt ......................... 382/103

(Continued)

FOREIGN PATENT DOCUMENTS

| EP | 1 379 063 | 1/2004 |
| JP | 2004-040445 | 2/2004 |

(Continued)

OTHER PUBLICATIONS

International Search Report issued Jan. 10, 2012 in International (PCT) Application No. PCT/JP2011/006257.

*Primary Examiner* — Samir Ahmed
(74) *Attorney, Agent, or Firm* — Wenderoth, Lind & Ponack, L.L.P.

(57) ABSTRACT

A depth information generating device includes a region extracting unit that detects a human face in at least one two-dimensional image, and based on the detected face, extracts a human figure region indicating a human figure within a region of the at least one two-dimensional image; and a depth map generating unit that gives a depth value different from a depth value of a region other than the human figure region to the human figure region to generate a depth map that separates the human figure region from the region other than the human figure region.

11 Claims, 24 Drawing Sheets

(56) References Cited

U.S. PATENT DOCUMENTS

| | | |
|---|---|---|
| 7,262,767 B2 | 8/2007 | Yamada |
| 7,340,079 B2 * | 3/2008 | Segawa et al. ............... 382/118 |
| 7,587,083 B2 | 9/2009 | Tabata et al. |
| 7,889,192 B2 | 2/2011 | Konya et al. |
| 8,611,604 B2 * | 12/2013 | Fujiyoshi ..................... 382/103 |
| 2004/0004616 A1 | 1/2004 | Konya et al. |
| 2007/0041640 A1 | 2/2007 | Tabata et al. |
| 2010/0014781 A1 | 1/2010 | Liu et al. |
| 2010/0278426 A1 * | 11/2010 | Piramuthu ................... 382/173 |

FOREIGN PATENT DOCUMENTS

| | | |
|---|---|---|
| JP | 2004-303193 | 10/2004 |
| JP | 2005-157584 | 6/2005 |

* cited by examiner

DEPTH INFORMATION GENERATING DEVICE, DEPTH INFORMATION GENERATING METHOD, AND STEREO IMAGE CONVERTER

TECHNICAL FIELD

The present invention relates to depth information generating devices, depth information generating methods, and stereo image converters, and particularly relates to a depth information generating device, a depth information generating method, and a stereo image converter for generating a depth map from a two-dimensional image.

BACKGROUND OF INVENTION

A method for converting a two-dimensional image (2D image) to a three-dimensional image (3D image) is known in which depth information (hereinafter, referred to as a depth map) in the 2D image is generated, and using the generated depth map, a stereoscopic pair corresponding to the 2D image (a left eye image and a right eye image) is synthesized.

For example, PTL 1 discloses a method for producing a 3D image on the basis of a 2D image including disparity information. Specifically, in PTL 1, a 2D image is input, an image of a human face is extracted from the input 2D image to obtain a face image, and the disparity information is given to the obtained face image to produce a 3D image. The produced 3D image is output and displayed on a mobile device screen or the like.

PTL 2 discloses a method for generating a depth map from a basic structure model and a non-3D image, for example. Specifically, in the method disclosed in PTL 2, first, a statistical amount of the high frequency component or activity of the luminance signal in a predetermined region in the non-3D image (2D image) of a scene is calculated to estimate a depth structure of the scene. Next, based on the calculated statistical value and the composition ratio in each region, three basic depth map models corresponding to the non-3D image are generated. Finally, the R signal (R component in the RGB color space) in the non-3D image is superimposed on the generated basic depth model to generate a depth map corresponding to the non-3D image. Thus, in PTL 2, the depth information is estimated from the non-3D image.

PTL 3 discloses a method for converting a 2D image to a 3D image using a depth map generated on the basis of a sample image, for example. In the method disclosed in PTL 3, first, a background image of an input 2D image is subjected to matching using a database in which a sample image including depth information is stored as a background image. Next, based on the matched background image, a foreground image is extracted. Moreover, the foreground image of the 2D image is detected using a color segmentation method or a comparison technique using graph-based segmentation. Thus, the foreground image and the background image are extracted to generate a relative depth map of the foreground image and the background image. Thus, in PTL 3, the depth information is generated based on the sample image.

A Shape From Motion (SFM) method is also known as a method for generating a depth map using motion information to obtain motion disparity. The SFM method estimates the motion of an object across a video frame and a model according to the disparity of an moving object, the object being an object in a three-dimensional space (3D space). The SFM method estimates the motion of the object supposing that an object closer to a camera has disparity larger than that of an object far away from the camera,

CITATION LIST

Patent Literature

[PTL 1] Japanese Patent Application No. 2002-94285
[PTL 2] U.S. Pat. No. 7,262,767
[PTL 3] U.S. Patent Application Publication No. 20100014781

SUMMARY OF INVENTION

Unfortunately, when the depth map is generated by the conventional methods above, a viewer feels unnaturalness due to an insufficient 3D pop-out effect, as described below.

First, the method disclosed in PTL 1 performs only extraction of the face and giving of a depth value to the extracted face. Namely, not an entire human body is 3D popped out, and the 3D pop-out effect is insufficient. For this, the viewer feels unnaturalness. Particularly, the unnaturalness is higher when the image is displayed on a larger screen, leading to an insufficient 3D pop-out effect.

Moreover, the method disclosed in PTL 2 has a problem such that an abnormal and stressful (unnatural) 3D image is generated, and artifacts are produced particularly in the vicinity of the boundary. This is attributed to the R signal adding processing and the model of the basic scene structure.

Further, the method disclosed in PTL 3, in which the object such as a human figure is discriminated as the foreground image, has a problem such that a flicker occurs between frames because the object in a temporal series of images (video) is not always discriminated as the foreground image. Additionally, a method for smoothing a depth map on the temporal series is needed to avoid the occurrence of the flicker, but no disclosure or suggestion of such a technique is found in PTL 3.

Finally, the SFM method as one of other known methods cannot produce a 3D object in a still picture or a portion without relative motion.

Thus, when the 2D image is converted to the 3D image using the depth map generated by the conventional methods, the viewer feels unnaturalness due to an insufficient 3D pop-out effect.

The present invention has been made in consideration of such circumstances. An object of the present invention is to provide a depth information generating device and a depth information generating method that generate a depth map for displaying a 3D pop-out from which a viewer feels no unnaturalness.

In order to achieve the object, a depth information generating device according to one embodiment of the present invention includes a region extracting unit configured to detect a human face in at least one two-dimensional image, and extract a human figure region based on the detected face, the human figure region indicating the human figure within a region in the at least one two-dimensional image; and a generating unit configured to generate a depth map for separating the human figure region from a region other than the human figure region by giving a depth value different from a depth value of the region other than the human figure region to the human figure region.

According to the configuration, the human figure region can be obtained using only the face detection. Thereby, a depth information generating device can be attained in which a depth map for displaying a 3D pop-out from which a viewer feels no unnaturalness can be generated.

Moreover, the region extracting unit may include a detecting unit configured to detect the human face in the at least one two-dimensional image; a temporary region setting unit configured to set a temporary human figure region based on a position of the detected human face, the temporary human figure region being a region of a human model including a region of the human face; and a human figure region determining unit configured to determine the human figure region based on a feature of the temporary human figure region and a feature of a pixel adjacent to the temporary human figure region.

Moreover, the human figure region determining unit may include a feature extracting unit configured to extract the feature within the temporary human figure region and a feature of a pixel adjacent to the temporary human figure region; a region adjusting unit configured to adjust a range of the temporary human figure region, based on the feature of the temporary human figure region and the feature of the pixel adjacent to the temporary human figure region extracted by the feature extracting unit; and a region determining unit configured to determine the range of the temporary human figure region adjusted by the region adjusting unit, as the human figure region.

Moreover, the feature extracting unit may include a histogram calculating unit configured to calculate a color histogram within the temporary human figure region as the feature of the temporary human figure region; a pixel selecting unit configured to select a pixel adjacent to the temporary human figure region; and a color information calculating unit configured to calculate color information on the pixel selected by the pixel selecting unit, as the feature of the pixel adjacent to the temporary human figure region.

Moreover, the region adjusting unit may include a comparing unit configured to compare the color information on the pixel calculated by the color information calculating unit with the color histogram calculated by the histogram calculating unit; and a region range updating unit configured to determine that the pixel is included in the human figure region and update the temporary human figure region to enlarge the range of the temporary human figure region, when a color of the pixel is a color included in the color histogram calculated by the histogram calculating unit; and determine that the pixel is not included in the human figure region and not to update the temporary human figure region, when the color of the pixel is not a color included in the color histogram.

Moreover, the generating unit may include a giving unit configured to calculate a first depth value of the human figure region extracted by the region extracting unit, based on a size and position of the human face detected by the detecting unit in the at least one two-dimensional image, and give the calculated first depth value to the human figure region; and a synthesizing unit configured to synthesize a second depth value given to the temporary human figure region set by the temporary region setting unit with the first depth value, to generate a depth map that separates the human figure region from the region other than the human figure region.

Moreover, the depth information generating device may further include a smoothing processing unit configured to smooth an edge of the human figure region in the depth map generated by the generating unit, using information on the at least one two-dimensional image.

Moreover, the smoothing processing unit may be configured to smooth the edge of the human figure region in the depth map by spatially filtering the depth map, using the at least one two-dimensional image and the depth map generated by the generating unit, based on a weight function calculated based on a pixel intensity of the at least one two-dimensional image.

Moreover, the smoothing processing unit may be configured to smooth the edge of the human figure region in the depth map by spatially and temporally filtering the depth map, using a target frame and a preceding frame in the two-dimensional images and the depth map generated by the generating unit, based on a weight function calculated based on pixel intensities of image data on the target frame and the preceding frame and a difference between the pixel intensities.

Moreover, in order to achieve the object, a stereo image converter according to one embodiment of the present invention includes the depth information generating device; and a rendering unit configured to convert the at least one two-dimensional image to a stereo image corresponding to the at least one two-dimensional image using the depth map generated by the depth information generating device.

Moreover, in order to achieve the object, a depth information generating device according to one embodiment of the present invention includes a region extracting unit configured to detect a target region in at least one two-dimensional image, and extract an interest object region within a region of the at least one two-dimensional image based on the detected target region, the target region being a region statistically detectable in an interest object; and a generating unit configured to generate a depth map for separating the interest object region from a region other than the interest object region by giving a depth value different from a depth value of the region other than the interest object region to the interest object region.

Moreover, the region extracting unit may include a detecting unit configured to detect the target region in the at least one two-dimensional image; a temporary region setting unit configured to set a temporary interest object region based on a position of the detected target region, the temporary interest object region being a region of a interest object model including a region of the detected target region; and an interest object region determining unit configured to update a range of the temporary interest object region based on a feature of the temporary interest object region and a feature of a pixel adjacent to the temporary interest object region, to determine an interest object region.

Moreover, the interest object may be an object detectable by a computer and include at least one of a cat, a dog, a bird, and a food.

Moreover, the depth information generating device may further include a smoothing processing unit configured to smooth an edge of the interest object region in the depth map generated by the generating unit, using information on the at least one two-dimensional image.

Moreover, the depth information generating device may further include a receiving unit configured to receive designated data designated by a user; wherein the designated data indicates the focused target region designated by the user; and the region extracting unit is configured to detect the target region from the designated interest object region based on the designated data.

Moreover, the detecting unit may be configured to detect the target region in the at least one two-dimensional image based on the designated data, and specify a position of the target region.

Moreover, the generating unit may include a giving unit configured to calculate a first depth value of the interest object region extracted by the region extracting unit on the basis of a size and position of the target region detected by the detecting unit in the at least one two-dimensional image and the designated data to be input, and give the calculated first depth value to the interest object region; and a synthesizing unit configured to synthesize the second depth value given to the temporary interest object region set by the temporary region setting unit with the first depth value, to generate a depth map that separates the interest object region from the region other than the interest object region.

Moreover, in order to achieve the object, a depth information generating method according to one embodiment of the present invention includes detecting a human face in at least one two-dimensional image, and extracting a human figure region based on the detected face, the human figure region indicating a human figure within a region of the at least one two-dimensional image; and generating a depth map for separating the human figure region from a region other than the human figure region by giving a depth value different from a depth value of the region other than the human figure region to the human figure region.

According to the present invention, a depth information generating device, a depth information generating method, and a stereo image converter can be attained in which a depth map for displaying a 3D pop-out from which a viewer feels no unnaturalness can be generated. Moreover, according to the present invention, a natural and stress-free 3D pop-out effect is obtained in a variety of scenes because real-time operation can be performed efficiently with a small capacity of a memory and a boundary of an object can be automatically distinguished with high precision.

Moreover, another effect of the present invention is that the human figure region is obtained using only the face detection. Accordingly, the present invention uses the capacity of the memory smaller than that in the method disclosed in PTL 3. Further, the present invention can be used for real-time applications because of a small time lag.

Accordingly, the present invention has an effect beyond those in the related art PTL 1 and other known methods. Moreover, the present invention obtains the human figure region using only the face detection. Accordingly, the present invention uses the capacity of the memory smaller than that in the method disclosed in PTL 3. Further, the present invention can be used for real-time applications because of a small time lag.

DETAILED DESCRIPTION OF INVENTION

Hereinafter, an embodiment of the present invention will be described with reference to the drawings. The drawings are schematic views, and are not always precise illustration.

In the embodiment described below, one specific preferred example of the present invention is shown. Numeric values, shapes, components, and arrangement and connection forms of the components shown in the embodiment are only an example, and will not limit the present invention. The present invention is limited by the scope of claims. Accordingly, among the components in the embodiment below, the components not described in independent claims are not always necessary for achievement of the object of the present invention, and will be described as elements that constitute more preferred embodiments.

Figure 1:
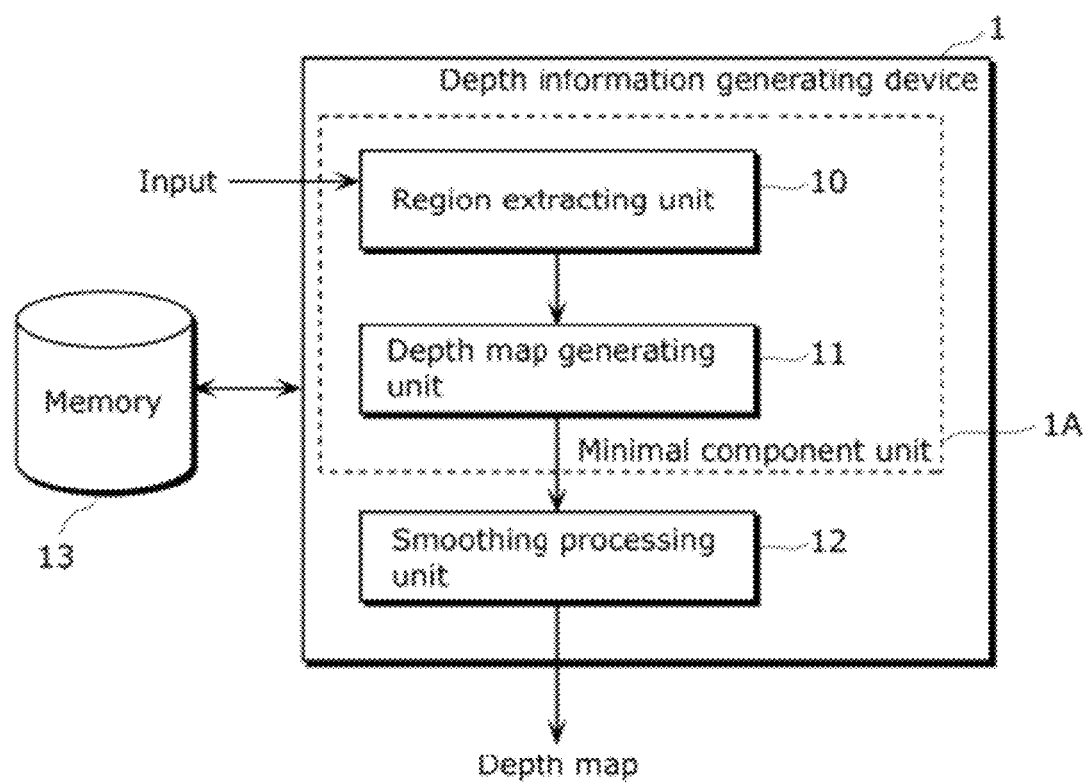
FIG. 1 is a functional block diagram of a depth information generating device according to an embodiment of the present invention.

FIG. 1 is a functional block diagram of a depth information generating device according to the embodiment of the present invention.

A depth information generating device 1 shown in FIG. 1 corresponds to the depth information generating device according to the present invention, and generates a depth map from an input two-dimensional image. Here, the depth map is depth information mapped into a 2D image, the depth information being information for separating an object for detection (detection target object) from a background on the 2D image. The two-dimensional image may be a single two-dimensional image, or may be a series of two-dimensional images that form a video.

The depth information generating device 1 includes a region extracting unit 10, a depth map generating unit 11, and a smoothing processing unit 12. The depth information generating device 1 uses a memory 13 provided outside thereof.

The region extracting unit 10 detects a human face from the input two-dimensional (2D) image, and extracts a human figure region based on the extracted human face, the human figure region indicating a human figure within a region of the two-dimensional image.

Specifically, using a known detection algorithm, the region extracting unit 10 detects a statistically detectable target region in an interest object to extract an interest object region within the two-dimensional image. Here, the interest object is typically a human figure, but not limited thereto. The interest object may be any objects detectable by a computer such as cats, dogs, birds, and foods. Hereinafter, in the present embodiment, the case where the interest object is a human figure and the target region is a face will be described. Namely, in the present embodiment, using a face detection algorithm, the region extracting unit 10 detects a human face region existing within the two-dimensional image. Based on the size of the detected face region, the region extracting unit 10 extracts the human figure region including the face region.

The depth map generating unit 11 gives a depth value different from a depth value of a region other than the human figure region to the extracted human figure region. Thereby, a depth map for separating the human figure region from the region other than the human figure region is generated.

Specifically, first, in the depth map generating unit 11, the depth value of the human figure region extracted in the region extracting unit 10 is given to generate a temporary depth map for the human figure region. Then, a depth value of the temporary human figure region first set as the human figure region based on the detected face (temporary human figure region) is synthesized with the temporary depth map to generate the depth map of the human figure region. Thereby, a value different from that of the region other than the human figure region (background) is given to the depth map of the human figure region to separate the human figure region from the background. The depth value of the human figure region is set such that the human figure region is closer to a camera than the background. For example, supposing that the depth map is generated from an 8-bit gray scale image, the value representing the depth (range of the depth value) is 0 to 255, 255 is given when an object is closest to the camera, and 0 is given when an object is far from the camera (or it is the background).

The smoothing processing unit 12 uses at least the information on the two-dimensional image and performs smoothing of an edge of the human figure region in the depth map generated by the depth map generating unit 11.

Specifically, when the two-dimensional image is input to the depth information generating device 1, based on a weight function calculated based on the pixel intensity of the two-dimensional image, the smoothing processing unit 12 spatially filters the depth map using the two-dimensional image and the depth map generated by the depth map generating unit 11. Thus, the smoothing processing unit 12 smoothes the edge of the human figure region in the depth map generated by the depth map generating unit 11.

Moreover, when a video is input to the depth information generating device 1, based on the calculated weight function, the smoothing processing unit 12 spatially and temporally filters the depth map using a target frame and a preceding frame in the two-dimensional images and the depth map generated by the depth map generating unit 11. Here, the weight function is calculated based on the pixel intensities of the image data on the target frame and the preceding frame in a plurality of two-dimensional images and the difference between the pixel intensities. Thus, the smoothing processing unit 12 smoothes the edge of the human figure region in the depth map.

In other words, the smoothing processing unit 12 creates a three-dimensional image grid using the two-dimensional images of the target frame and the preceding frame. In the processing, based on the adjacent layer information (region other than the human figure region) and the object layer information (human figure region) extracted from the two-dimensional images of the target frame and the preceding frame, the pixels in the data of the depth map generated by the depth map generating unit 11 are smoothed.

As above, the smoothing processing unit 12 performs the smoothing processing on the depth map generated for the human figure region and the region other than the human figure region (background). This is because 100% accuracy is not guaranteed in the depth map generated by the depth map generating unit 11, and some failure occurs in the boundary of the human figure almost all the cases. For example, when a three-dimensional image is generated from the depth map generated by the depth map generating unit 11 without smoothing, the human figure looks meshed or uneven. This means that the depth map generated by the depth map generating unit 11 is not a depth map with high accuracy.

The memory 13 stores data used by the depth information generating device 1 such as a face feature pattern and temporal image information. The memory 13 is composed of a flash-based memory card or a hard drive, for example.

The depth information generating device 1 has the configuration as above. The depth information generating device 1 extracts the depth information on the human figure region from the two-dimensional image, and generates the depth map of the human figure region and the region other than the human figure region.

Next, an outline of the processing until the thus-configured depth information generating device 1 generates the depth map will be described.

Figure 2:
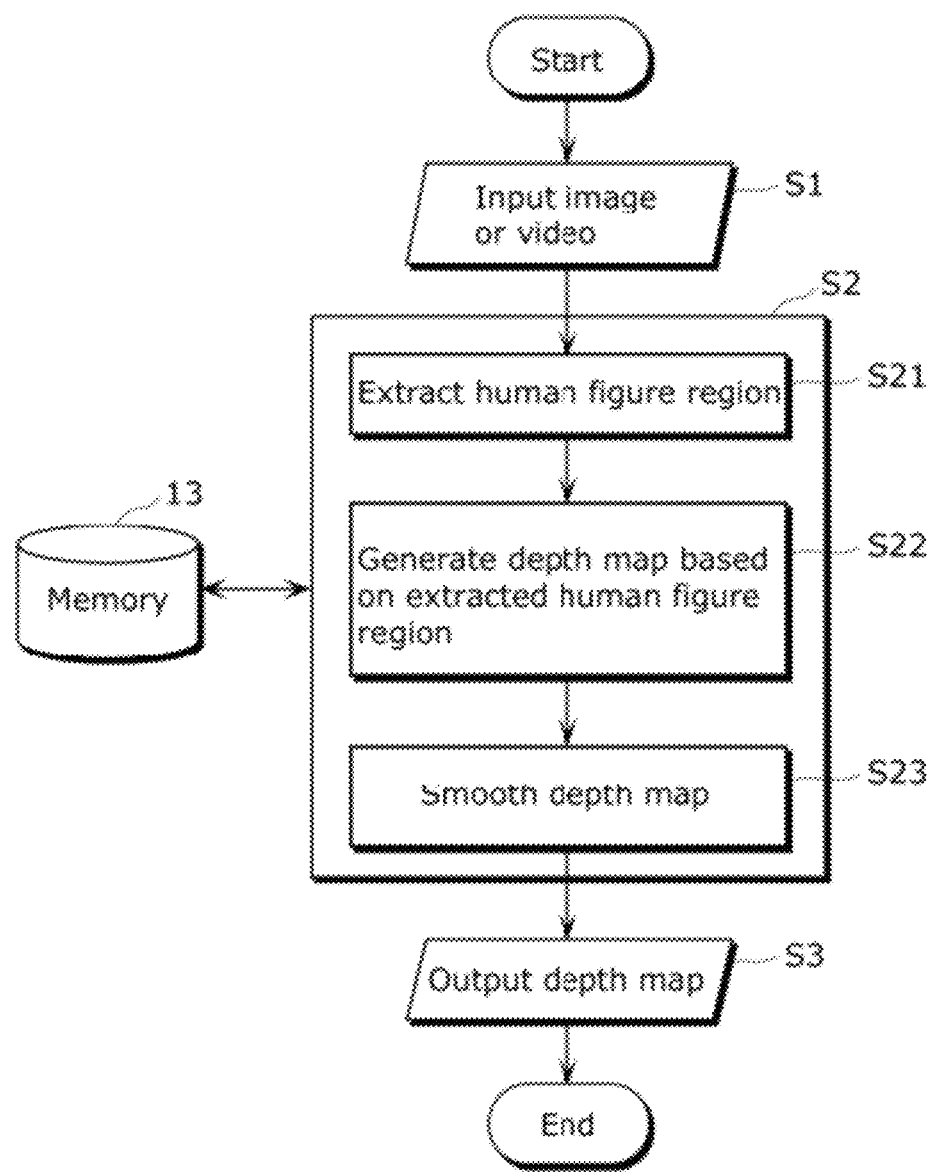
FIG. 2 is a flowchart for describing an outline of a processing by the depth information generating device according to the embodiment of the present invention.

FIG. 2 is a flowchart for describing the outline of the processing by the depth information generating device 1 according to the embodiment of the present invention.

First, an image or a video is input into the depth information generating device 1 (S1).

Next, in S2, the depth information generating device 1 generates the depth map. Specifically, the depth information generating device 1 detects the human face from the two-dimensional image, and based on the detected face, extracts the human figure region indicating a human figure within the region in the two-dimensional image (S21). Subsequently, the depth information generating device 1 gives to a depth value different from the depth value of the region other than the human figure region to the extracted human figure region. Thereby, the depth map for separating the human figure region from the region other than the human figure region is generated (S22). Further, using the information on the two-dimensional image, the edge of the human figure region in the generated depth map is smoothed (S23). Thus, the depth information generating device 1 generates the depth map.

Finally, the depth information generating device 1 outputs the generated depth map (S23).

Next, details of components in the depth information generating device 1 and a flow of the processing thereof will be described.

First, details of the configuration of the region extracting unit 10 will be described.

Figure 3:
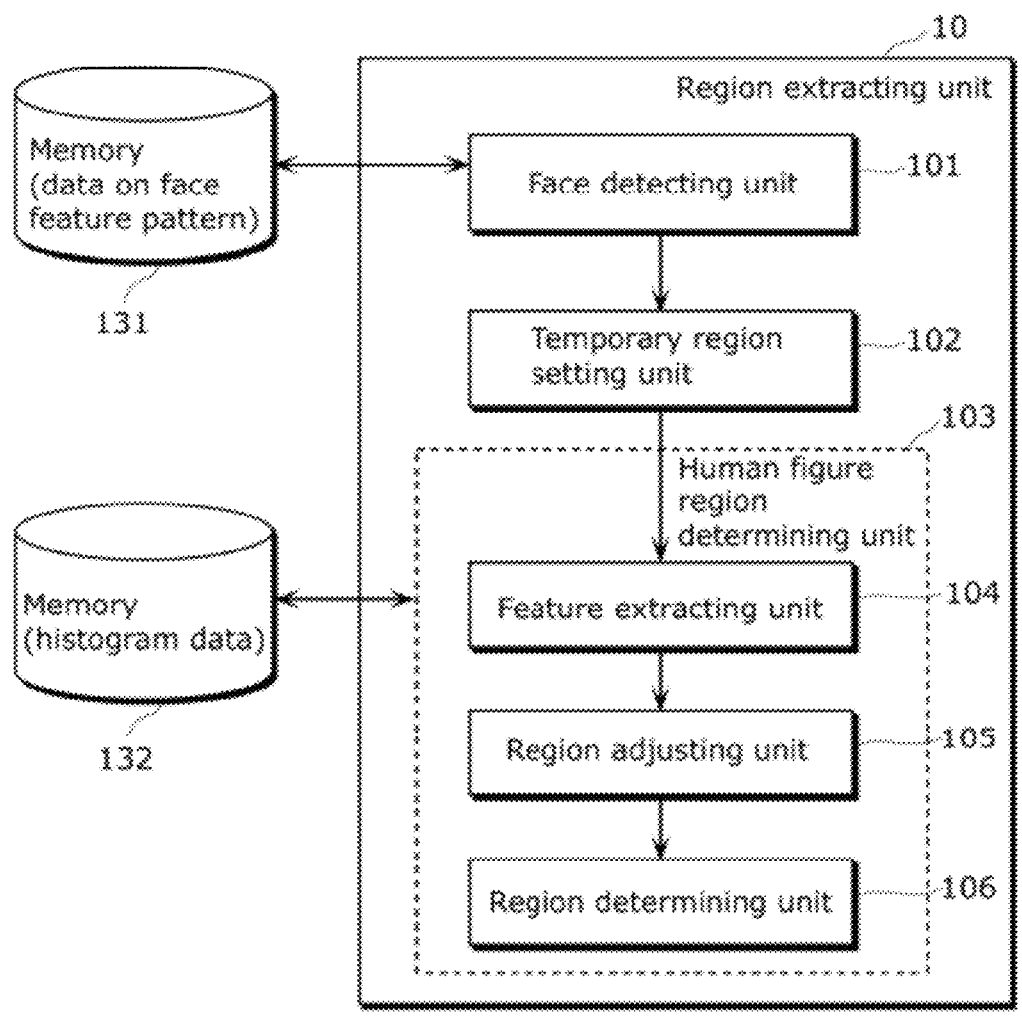
FIG. 3 is a drawing showing details of the configuration of a region extracting unit according to the embodiment of the present invention.
Figure 4:
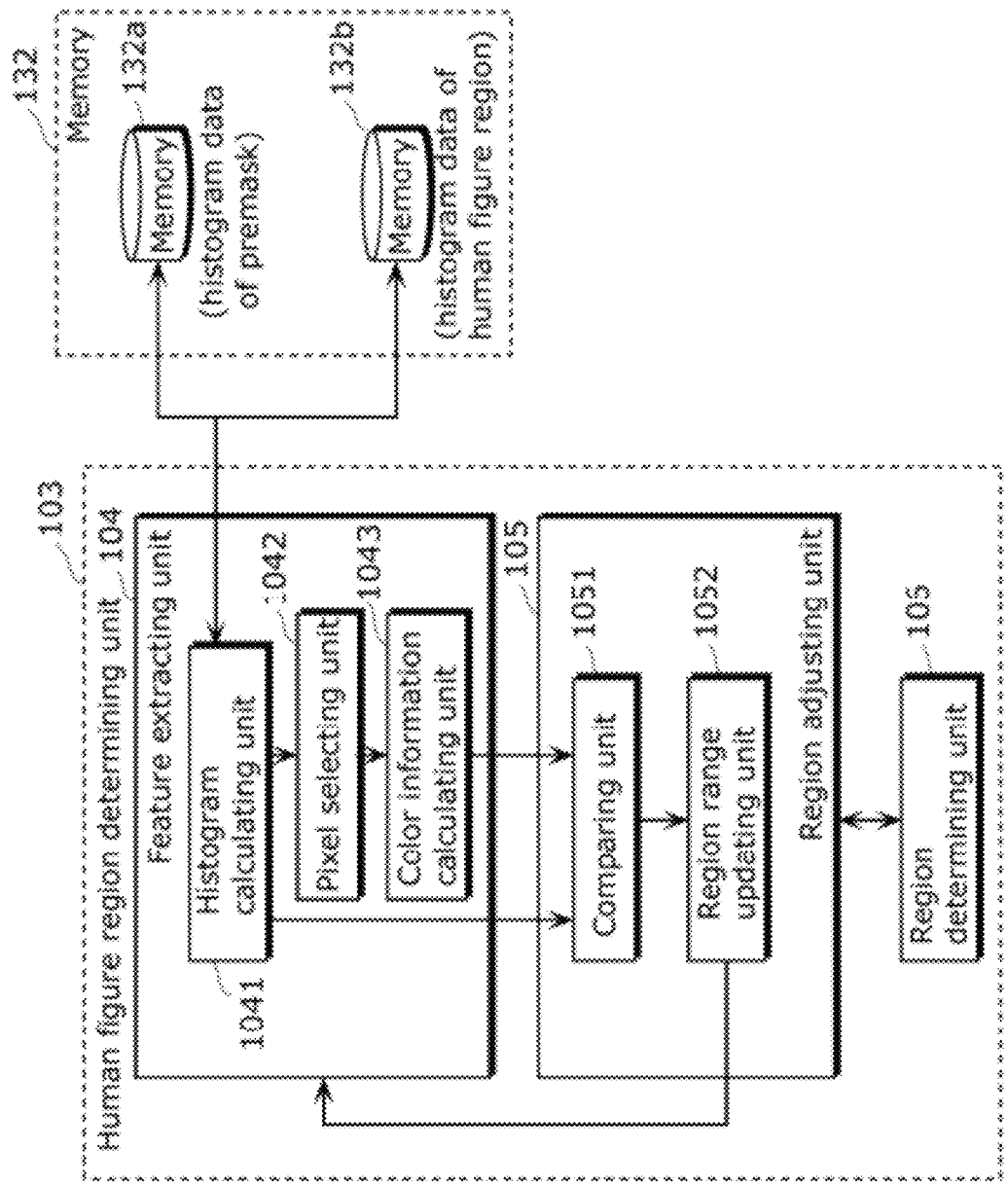
FIG. 4 is a drawing showing details of the configuration of a human figure region determining unit according to the embodiment of the present invention.

FIG. 3 is a drawing showing details of a configuration of a region extracting unit 10 according to the embodiment of the present invention. FIG. 4 is a drawing showing details of a configuration of a human figure region determining unit 103 according to the embodiment of the present invention.

As shown in FIG. 3, the region extracting unit 10 includes a face detecting unit 101, a temporary region setting unit 102, and a human figure region determining unit 103.

Here, a memory 131 and a memory 132 are part of the memory 13. The memory 131 stores the data used by the face detecting unit 101 and the temporary region setting unit 102, e.g., the data on the face feature pattern and region data of a human model (also referred to as a premask). The memory 132 stores the data used by the human figure region determining unit 103, e.g., the data of a color histogram of the premask.

The face detecting unit 101 detects the human face in the two-dimensional image. Specifically, the face detecting unit 101 detects the face in the two-dimensional image by a face detection algorithm on the basis of face image data stored in the memory 131 and including the face feature pattern.

Based on the position of the human face detected by the face detecting unit 101, the temporary region setting unit 102 sets the temporary human figure region, which is a region of the human model including the region of the detected human face. Specifically, based on the size and position of the face detected by the face detecting unit 101 in the two-dimensional image, the temporary region setting unit 102 selects the premask stored in the memory 131, and applies the premask so as to include the detected face. Namely, the size of the premask is changed according to the size of the detected face, and determined. Thus, the temporary region setting unit 102 sets the temporary human figure region.

As shown in FIG. 3, the human figure region determining unit 103 includes a feature extracting unit 104, a region adjusting unit 105, and a region determining unit 106. The human figure region determining unit 103 determines the human figure region based on the feature of the temporary human figure region and the feature of a pixel adjacent to the temporary human figure region.

The feature extracting unit 104 extracts the feature within the temporary human figure region and the feature of the pixel adjacent to the temporary human figure region.

More specifically, as shown in FIG. 4, the feature extracting unit 104 includes a histogram calculating unit 1041, a pixel selecting unit 1042, and a color information calculating unit 1043. The histogram calculating unit 1041 calculates the color histogram within the temporary human figure region as the feature of the temporary human figure region. The histogram calculating unit 1041 stores the calculated color histogram within the temporary human figure region in the memory 132. The pixel selecting unit 1042 selects the pixel adjacent to the temporary human figure region. The color information calculating unit 1043 calculates the color information (hue and luminance) on the pixel selected by the pixel selecting unit 1042 as the feature of the pixel adjacent to the temporary human figure region.

The region adjusting unit 105 adjusts the range of the temporary human figure region on the basis of the feature of the temporary human figure region extracted by the feature extracting unit 104 and the feature of the pixel adjacent to the temporary human figure region. The region adjusting unit 105 determines the adjusted range of the temporary human figure region as the human figure region, and outputs the determined human figure region.

More specifically, as shown in FIG. 4, the region adjusting unit 105 includes a comparing unit 1051 and a region range updating unit 1052.

The comparing unit 1051 compares the color information on the pixel calculated by the color information calculating unit 1043 with the color histogram calculated by the histogram calculating unit 1041. When the color of the pixel is a color included in the color histogram calculated by the histogram calculating unit 1041, the region range updating unit 1052 determines that the pixel is included in the human figure region, and updates the temporary human figure region such that the range of the temporary human figure region includes the pixel. On the other hand, when the color of the pixel is not a color included in the color histogram calculated by the histogram calculating unit 1041, the region range updating unit 1052 determines that the pixel is not included in the human figure region, and does not update the temporary human figure region.

When update of the temporary human figure region by the region range updating unit 1052 is completed, the region determining unit 106 determines the range of the temporary human figure region adjusted by the region adjusting unit 105 as the human figure region.

As above, the region extracting unit 10 is configured.

Next, the processing by the region extracting unit 10 will be described.

Figure 5:
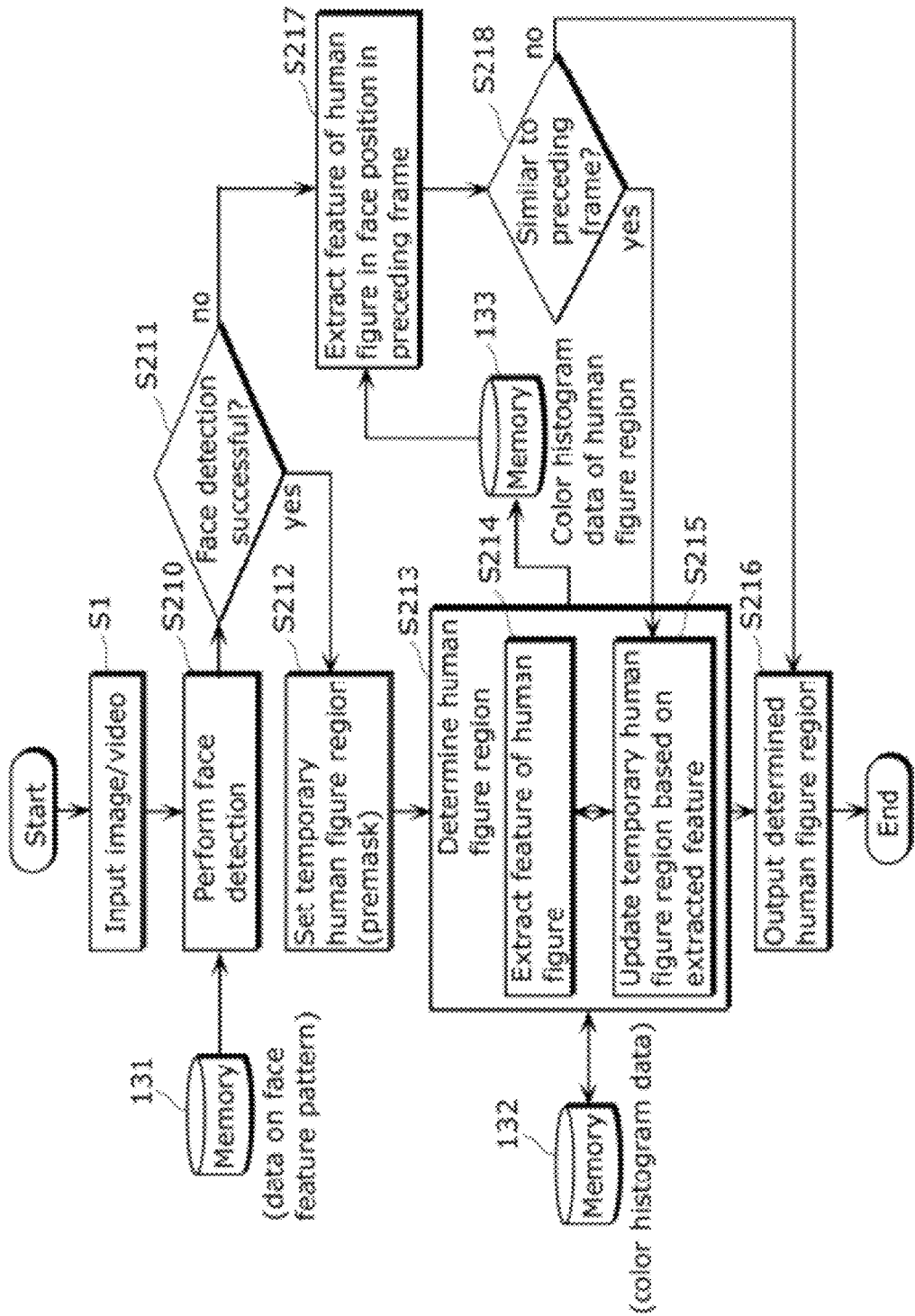
FIG. 5 is a flowchart for describing a processing by the region extracting unit according to the embodiment of the present invention.
Figure 6A:
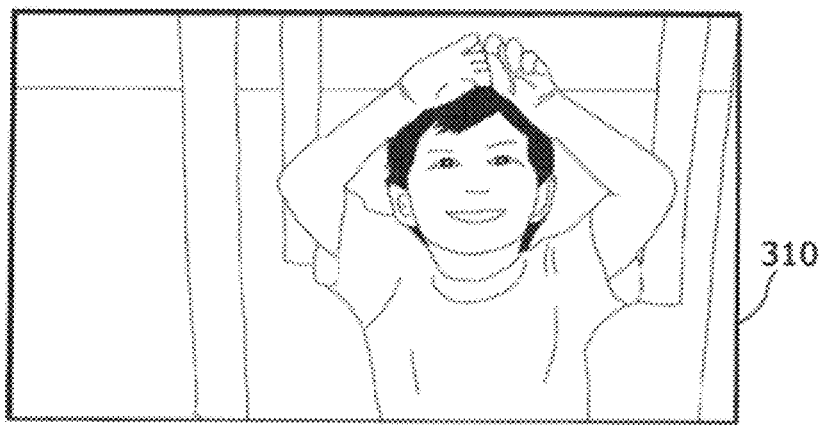
FIG. 6A is a drawing for describing a manner of the processing in which the region extracting unit according to the embodiment of the present invention extracts a temporary human figure region from a two-dimensional image.
Figure 6B:
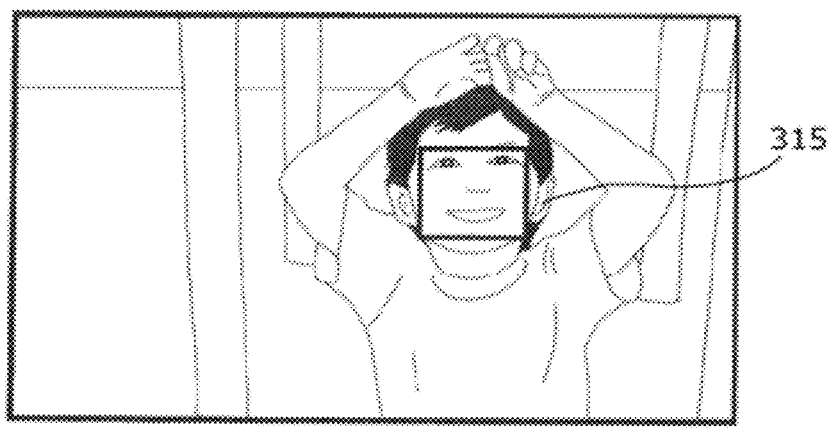
FIG. 6B is a drawing for describing a manner of the processing in which the region extracting unit according to the embodiment of the present invention extracts a temporary human figure region from a two-dimensional image.
Figure 6C:
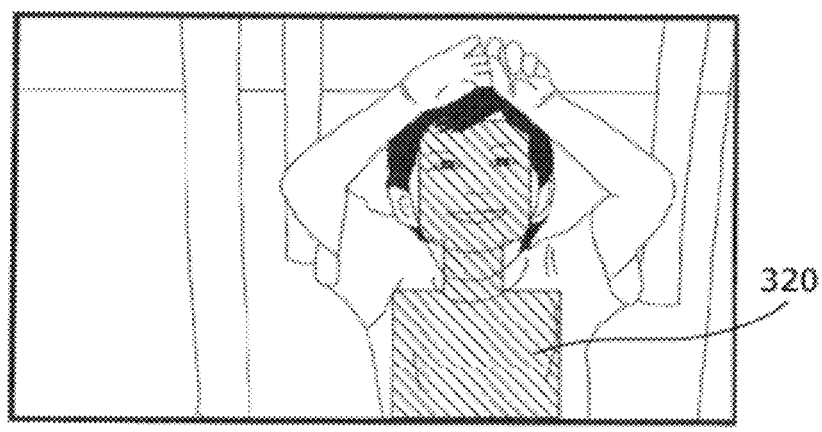
FIG. 6C is a drawing for describing a manner of the processing in which the region extracting unit according to the embodiment of the present invention extracts a temporary human figure region from a two-dimensional image.

FIG. 5 is a flowchart for describing the processing by the region extracting unit 10 according to the embodiment of the present invention. FIGS. 6A to 6C are drawings for describing the manner of the processing in which the region extracting unit 10 extracts the temporary human figure region from the two-dimensional image.

First, an image or a video is input to the depth information generating device 1 (S1). For example, a frame 310 shown in FIG. 6A is input to the depth information generating device 1 as a two-dimensional image that forms a video.

Next, the face detecting unit 101 detects the human face in the two-dimensional image (S210), and checks whether the human face in the two-dimensional image is successfully detected (S211). Here, for example, the face detecting unit 101 detects a human face 315 in the frame 310 as shown in FIG. 6B when the face detection is successful.

When the face detection by the face detecting unit 101 is successful (Yes in S211), based on the position of the human face detected by the face detecting unit 101, the temporary region setting unit 102 sets the temporary human figure region, which is a region of the human model including the region of the human face (S212). Here, for example, as shown in FIG. 6C, the temporary region setting unit 102 sets the temporary human figure region 320 on the basis of the position of the human face detected by the face detecting unit 101. The temporary human figure region 320 is created based on the size of the face on the premise that the human figure includes a head, a neck, a body, and a leg. Moreover, as described above, the size of the temporary human figure region 320 is changed (enlarged or reduced) based on the size of the detected face.

Next, in S213, the human figure region determining unit 103 determines the human figure region on the basis of the feature of the temporary human figure region and the feature of the pixel adjacent to the temporary human figure region.

Specifically, first, the feature extracting unit 104 extracts the feature within the temporary human figure region and the feature of the pixel adjacent to the temporary human figure region (S214). Here, in the memory 132, the feature extracting unit 104 stores the feature extracted corresponding to the first temporary human figure region (premask) set by the temporary region setting unit 102. The data stored in the memory 132 (data on the feature of the premask) is the color histogram of the premask. The detail will be described later, and the description thereof will be omitted here.

Subsequently, the region adjusting unit 105 adjusts the range of the temporary human figure region on the basis of the feature of the temporary human figure region extracted by the feature extracting unit 104 and the feature of the pixel adjacent to the temporary human figure region (S215). When the adjustment of the range of the temporary human figure region (updating of the temporary human figure region) is completed, the region determining unit 106 determines the range of the temporary human figure region after adjustment (after updating) as the human figure region. Here, in the memory 133, the feature extracting unit 104 stores the feature extracted corresponding to the human figure region determined by the region determining unit 106. The data stored in the memory 133 is the color histogram of the determined human figure region. The detail will be described later, and the description thereof will be omitted here.

Then, the region adjusting unit 105 outputs the determined human figure region (S216).

In the depth information generating device 1, when an image (two-dimensional image) is input in S1 and the face detection in the face detecting unit 101 is failed in S211 (No in S211), the processing is terminated without performing the processings in S217 and S218.

On the other hand, in the depth information generating device 1, when a video is input in S1 and the face detection in the face detecting unit 101 is failed in S211 (No in S211), a processing in S217 is performed. Namely, in S217, based on the position of the face detected in the preceding frame (two-dimensional image), the depth information generating device 1 extracts the feature of the human figure. Here, the preceding frame means a frame temporally immediately preceding the target frame for the face detection processing in S211 in a temporal series of two-dimensional images (frames) that form the video input in S1.

More specifically, in S217, based on the position of the human face detected when the face detecting unit 101 performs the face detection in the preceding frame, the temporary region setting unit 102 sets the temporary human figure region that is the region of the human model including the region of the detected human face. Next, the feature extracting unit 104 extracts the feature within the temporary human figure region.

Next, in S218, the region adjusting unit 105 compares the feature (color histogram) of the human figure region in the preceding frame stored in the memory 133 with the feature within the temporary human figure region extracted in S218. When the feature within the temporary human figure region extracted in S218 is similar to the feature of the human figure region in the preceding frame, the region adjusting unit 105 goes to S215. Namely, the depth information generating device 1 goes to S215, and repeats the processings in S214 and S215 to determine the human figure region. On the other hand, when the region adjusting unit 105 determines that the feature within the temporary human figure region extracted in S218 is not similar to the feature of the human figure region in the preceding frame, the region adjusting unit 105 goes to S216.

Thus, in the case of the video (moving picture), the face detection is not always successful. For this, as in the processings in S217 and S218, tracing of the human figure region (temporal matching of the human figure region) is performed to prevent a flicker from occurring in a 3D video to be generated later.

As above, the region extracting unit 10 performs the processing.

Here, the processing by the human figure region determining unit 103 (S213) in the region extracting unit 10 will be described in detail.

Figure 7:
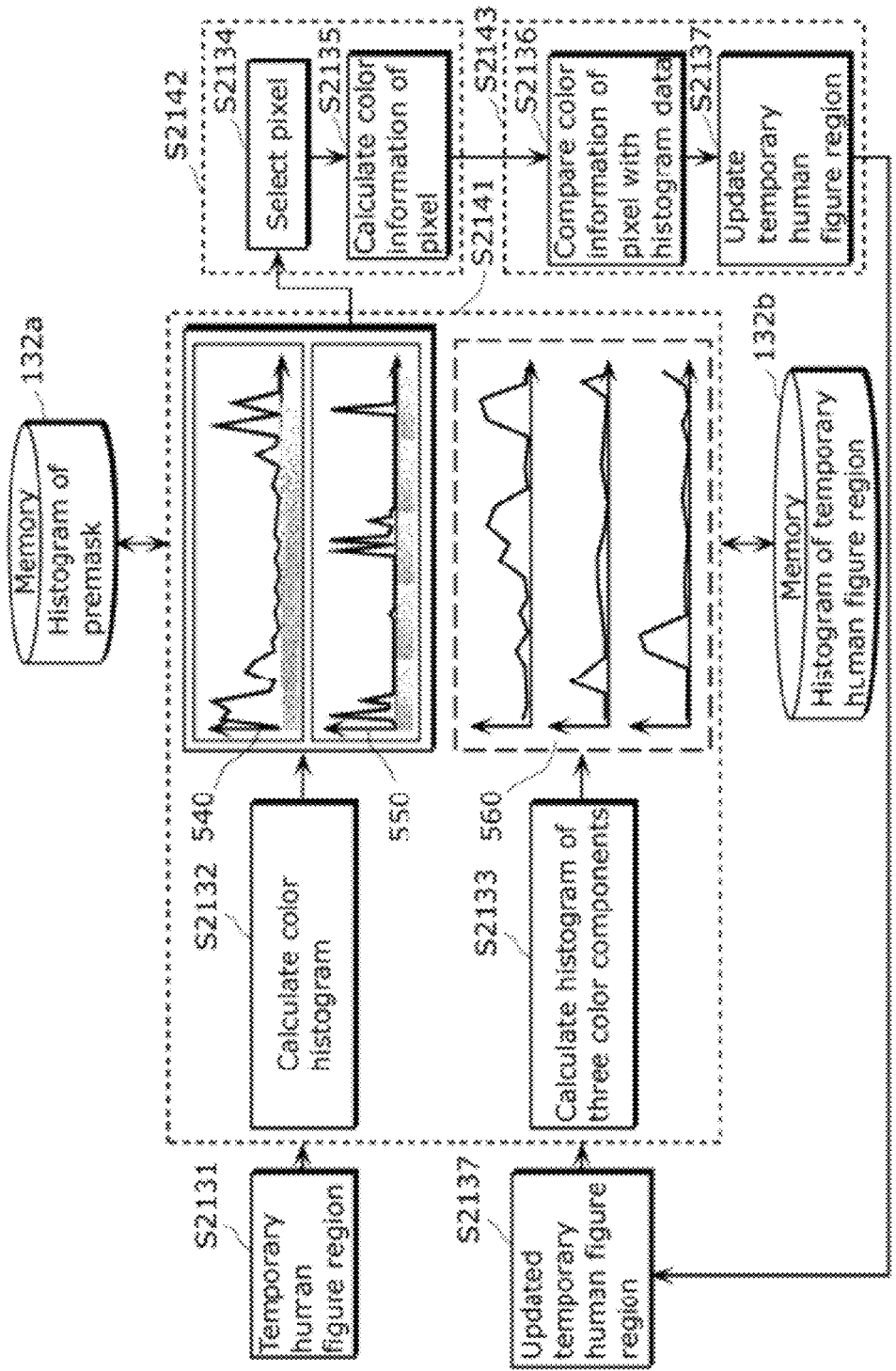
FIG. 7 is a flowchart for describing a processing by the human figure region determining unit according to the embodiment of the present invention.
Figure 8:
FIG. 8 is a drawing for describing a manner of the processing in which the human figure region determining unit according to the embodiment of the present invention determines a human figure region.

FIG. 7 is a flowchart for describing the processing by the human figure region determining unit 103 according to the embodiment of the present invention. FIG. 8 is a drawing for describing the manner of the processing when the human figure region determining unit 103 determines the human figure region.

In S214, first, the histogram calculating unit 1041 calculates the color histogram within the temporary human figure region as the feature of the temporary human figure region.

Specifically, the temporary region setting unit 102 sets the temporary human figure region (S2131). As the feature of the set temporary human figure region, the histogram calculating unit 1041 calculates a hue luminance (H-L) histogram and a gray scale histogram for the skin region such as the face in the temporary human figure region. As the feature of the set temporary human figure region, the histogram calculating unit 1041 also calculates a histogram of three color components for a region other than the skin region such as a cloth in the temporary human figure region. The histogram calculating unit 1041 stores the calculated color histogram of the temporary human figure region in a memory 132*a*. The memory 132*a* is part of a region in the memory 132

Here, the hue luminance color histogram is used to express a shade color and color graduation in the temporary human figure region. The gray scale histogram is used to express a region in which any color is not detected, for example, hair and a shadow. More specifically, in S2141, the histogram calculating unit 1041 calculates an H value (hue value) and L value (luminance value) for each of the pixels within the temporary human figure region. Then, as shown in FIG. 7, based on the HSL color model, the histogram calculating unit 1041 calculates a histogram 550 of hue luminance (H-L) for the skin region (S2132). When the color information on the pixel in the skin region indicating portions of the hair and the shadow cannot be extracted within the temporary human figure region (namely, in the case of a gray scale or black and white), a histogram 540 of the gray scale is calculated instead of the histogram 550 (S2132). Moreover, a histogram 550 of the three color components is calculated for the region other than the skin region (S2133).

The H-L color histogram expressed according to an H and L color channel is calculated for each of the pixels within the temporary human figure region. This is a key of the method for extracting the human figure region in the two-dimensional image. For example, when a pixel selected by the pixel selecting unit 1042 is detected as a color of red from the H value and L value of the pixel, it is found that the pixel exists in a weak light (dark) region. Namely, it is determined using the histogram 540 that the pixel exists within the range of the dark red region. On the other hand, even when the color information on the pixel selected by the pixel selecting unit 1042 cannot be extracted (namely, in the case of the gray scale or black and white), it is determined using the histogram 540 of the gray scale that the pixel exists within the temporary human figure region.

Next, in S2142, the pixel selecting unit 1042 selects a pixel adjacent to the temporary human figure region (S2134). As the feature of the pixel adjacent to the temporary human figure region, the color information calculating unit 1043 calculates the color information (hue and luminance) of the pixel selected by the pixel selecting unit 1042 (S2135).

Next, in S2143, the comparing unit 1051 compares the color information on the pixel calculated by the color information calculating unit 1043 with the color histogram calculated by the histogram calculating unit 1041 (S2136). The region range updating unit 1052 updates the temporary human figure region on the basis of the result obtained in the comparing unit 1051 (S2137). Specifically, in S2136, when the color of the pixel selected by the pixel selecting unit 1042 is a color included in the color histogram calculated by the histogram calculating unit 1041, the region range updating unit 1052 determines that the pixel is included in the human figure region, and updates the temporary human figure region such that the range of the temporary human figure region includes the pixel (here, the range of the temporary human figure region is enlarged). On the other hand, when the color of the pixel selected by the pixel selecting unit 1042 is not a color included in the histogram calculated by the histogram calculating unit 1041, the region range updating unit 1052 determines that the pixel is not included in the human figure region, and does not update the temporary human figure region.

Next, as the feature of the set temporary human figure region, the histogram calculating unit 1041 calculates the histogram 550 of hue luminance (H-L), the histogram 540 of the gray scale, and the histogram 560 of the three color components in the updated temporary human figure region for the temporary human figure region updated by the region range updating unit 1052. The histogram calculating unit 1041 stores the color histogram within the updated temporary human figure region in a memory 132*b*. The memory 132*b* is part of a region included in the memory 132

Thus, the human figure region determining unit 103 determines whether the pixels adjacent to the temporary human figure region are included in the temporary human figure region one by one, and updates the temporary human figure region (enlarged or reduced). By repeating such updating, the human figure region determining unit 103 can determine a human figure region 340 as shown in FIG. 8.

Namely, in S2142, the H value and L value of the pixel selected by the pixel selecting unit 1042 are calculated, and are subjected to matching (comparison) with the histograms 540 to 560 calculated by the histogram calculating unit 1041. When the HL value or gray scale value of the pixel is a value within the range of the calculated histograms 540 to 560, the pixel is included in the temporary human figure region. On the other hand, when the pixel does not have a value within the range of the histograms 540 to 560, it is determined that the pixel does not exist within the temporary human figure region, and the pixel is excluded. This means that the pixels having the color information (hue, luminance, or gray scale) similar to the color information on the pixels in the temporary human figure region are defined as the same group.

Usually, a region of an H (hue) may have unclarity such that the region cannot be distinguished (cannot be distinguished from a color of a different object), leading to matching by mistake. The problem, however, can be solved by extracting (distinguishing) the hue value of the pixel selected by the pixel selecting unit 1042 as in the present embodiment. Namely, as in the present embodiment, matching is performed using the hue value, and when the hue value cannot be extracted, the pixel is determined as a gray scale color, and matching is performed. Thus, the problem can be solved. Accordingly, as shown in FIG. 8, an approximately accurate shape of the human figure region 340 is obtained.

Here, the case where a video is input into the depth information generating device 1 will be described. As above, when the video (moving picture) is input, the face detection is not always successful. Hereinafter, as the detail of the processings in S217 and S218, the processing performed by the human figure region determining unit 103 will be described. FIGS. 9A to 9F are drawings for describing the manner of the processing in which the human figure region in the two-dimensional image is determined wherein the face detection is failed.

Figure 9A:
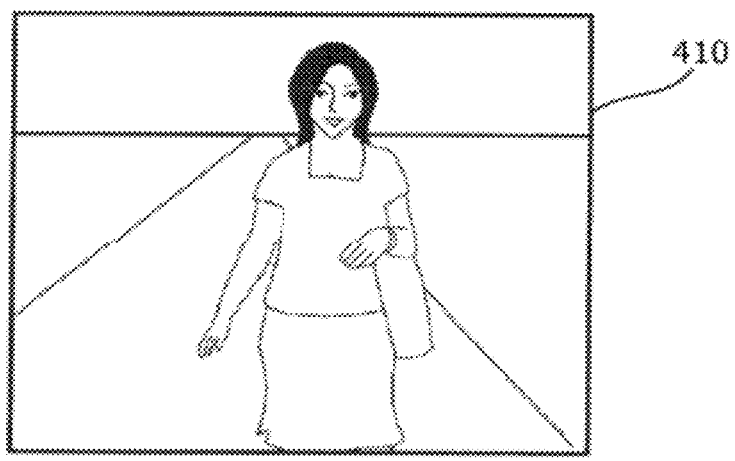
FIG. 9A is a drawing for describing a manner of a processing to determine the human figure region of the two-dimensional image in which face detection is failed.
Figure 9B:
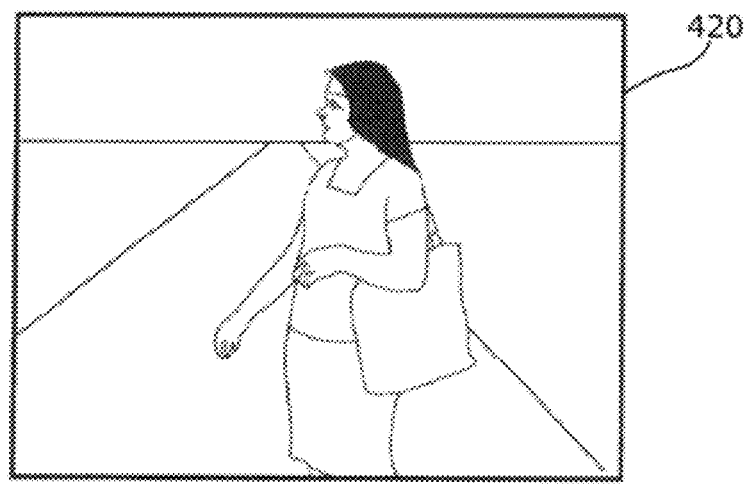
FIG. 9B is a drawing for describing a manner of the processing to determine the human figure region of the two-dimensional image in which face detection is failed.

When the video is input to the depth information generating device 1, for example, even if the face is successfully detected in a preceding frame 410 shown in FIG. 9A, the face may not be detected in the target frame 420 shown in FIG. 9B. In this case, when the depth map is generated as it is without considering consistency in the depth between the preceding frame and the target frame and a 3D video is generated, an unnatural 3D pop-out effect may be produced in the video corresponding to the preceding frame 410 and the target frame 420.

The problem is solved by using temporal matching of the human figure regions between the preceding frame and the target frame, as described in the processings in S217 and S218.

Figure 9C:
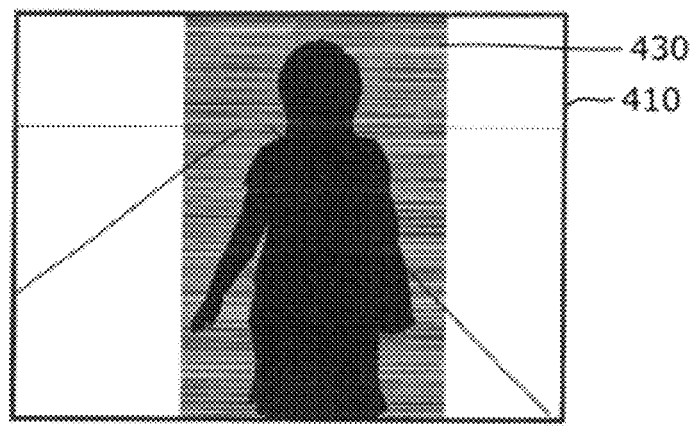
FIG. 9C is a drawing for describing a manner of the processing to determine the human figure region of the two-dimensional image in which face detection is failed.

Specifically, first, the preceding frame 410 is subjected to the processing in S2141. Namely, as shown in FIG. 9C, the histogram calculating unit 1041 calculates the color information (the histogram 560 of the three color components (RGB), the histogram 540, or the histogram 550) of the determined human figure region 430 for the preceding frame 410 in which the face detection is successful. The histogram calculating unit 1041 stores the color information (histogram) of the human figure region calculated for the preceding frame 410 in the memory 132b.

Figure 9D:
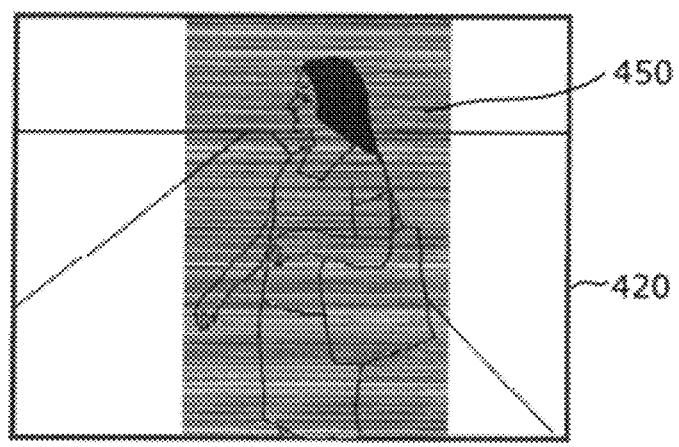
FIG. 9D is a drawing for describing a manner of the processing to determine the human figure region of the two-dimensional image in which face detection is failed.

Next, when the face detection is failed in the target frame 420 (No in S211), in S217, first, the temporary region setting unit 102 performs a processing as shown in FIG. 9D. Namely, based on the position of the human face successfully detected in the preceding frame 410 by the face detecting unit 101, the temporary region setting unit 102 sets the human figure region 430 determined in the preceding frame 410 as the temporary human figure region 450 of the target frame 420. Next, the feature extracting unit 104 extracts the feature (the histogram as the color information) within the temporary human figure region 450.

More specifically, the histogram calculating unit 1041 calculates the color information (color histogram) of the temporary human figure region 450 in the target frame 420.

Next, the region adjusting unit 105 compares the feature (color histogram) of the human figure region 430 in the preceding frame 410 stored in a memory 133 with the color information (color histogram) of the temporary human figure region 450 in the target frame 420 (S218). Namely, the region adjusting unit 105 calculates a degree of histogram similarity between two histograms, and determines whether the histogram of the human figure region 430 in the preceding frame 410 in which the face detection is successful may be set as the temporary human figure region 450 in the target frame 420.

Figure 9E:
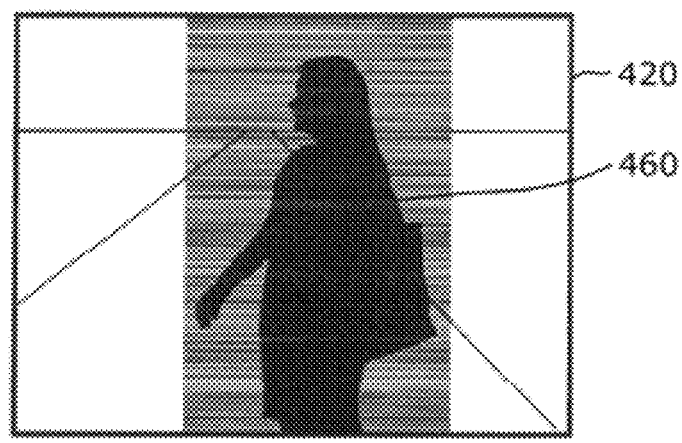
FIG. 9E is a drawing for describing a manner of the processing to determine the human figure region of the two-dimensional image in which face detection is failed.

In the depth information generating device 1, when the confidence value of the degree of histogram similarity exceeds a predetermined threshold value (Yes in S218), it is determined that the human figure region 430 in the preceding frame 410 is similar to the temporary human figure region 450 in the target frame 420. Using the color histogram extracted in the preceding frame 410, the human figure region determining unit 103 determines the human figure region for the target frame 420. Namely, the human figure region determining unit 103 repeatedly performs the processings in S214 and S215, and adjusts the temporary human figure region 460 in the target frame 420 as shown in FIG. 9E.

In the depth information generating device 1, when the confidence value of the degree of histogram similarity is not more than the predetermined threshold value, the temporary human figure region 450 set by the temporary region setting unit 102 and the color information (color histogram) associated therewith are deleted.

Figure 9F:
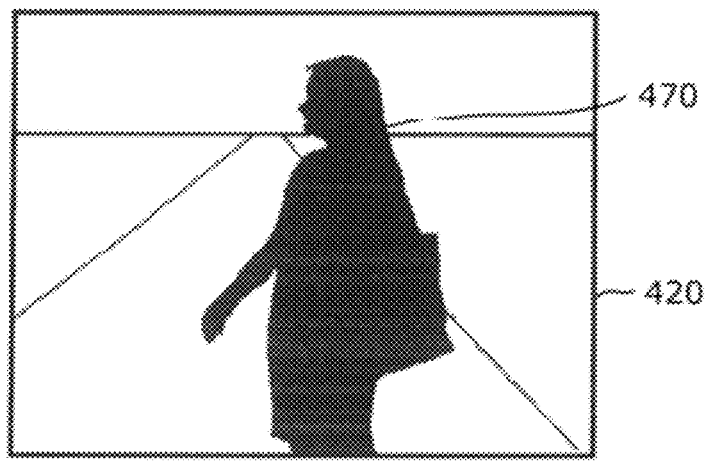
FIG. 9F is a drawing for describing a manner of a processing to determine the human figure region of the two-dimensional image in which face detection is failed.

Thus, the depth information generating device 1 can use the human figure region 430 determined in the preceding frame 410, in which the face detection is successful, as a temporal matching region to determine a human figure region 470 in the target frame 420 as shown in FIG. 9F for the target frame 420 in which the face detection is failed.

Next, details of the configuration of the depth map generating unit 11 will be described.

Figure 10:
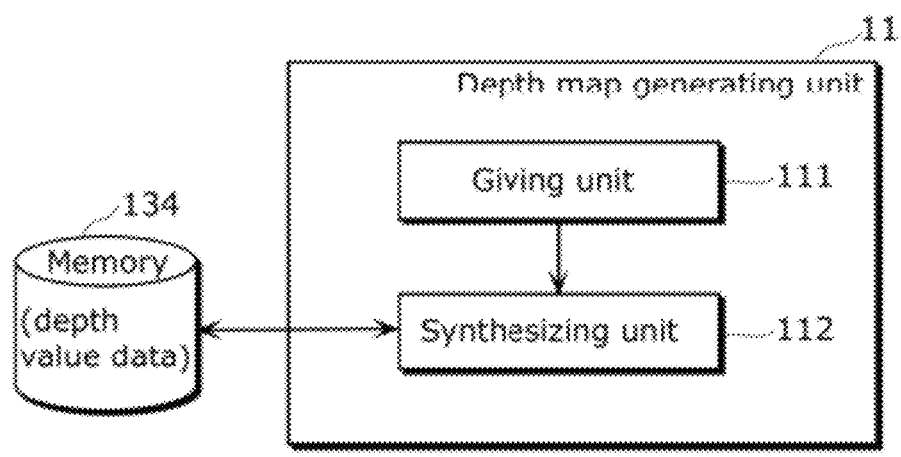
FIG. 10 is a drawing showing details of the configuration of a depth map generating unit according to the embodiment of the present invention.

FIG. 10 is a drawing showing details of the configuration of the depth map generating unit according to the embodiment of the present invention.

As shown in FIG. 10, the depth map generating unit 11 includes a giving unit 111 and a synthesizing unit 112. Here, the memory 134 is part of the memory 131. The memory 134 holds the data used by the depth map generating unit 11, e.g., the data such as a depth value (depth map) for the region of the human model (premask).

Based on the size and position of the human face detected by the face detecting unit 101 in the two-dimensional image, the giving unit 111 calculates a first depth value of the human figure region extracted by the region extracting unit 10. Then, the giving unit 111 gives the calculated first depth value to the human figure region. Thus, the giving unit 111 generates the temporary depth map for the human figure region extracted by the region extracting unit 10.

The synthesizing unit 112 synthesizes a second depth value given to the temporary human figure region set by the temporary region setting unit 102 with the first depth value, thereby to generate and obtain a depth map that separates the human figure region from the region other than the human figure region. Thus, the synthesizing unit 112 synthesizes the depth value for the premask with the temporary depth map to generate the depth map for the human figure region.

The depth map generating unit 11 is thus configured.

Next, the processing by the depth map generating unit 11 will be described.

Figure 11:
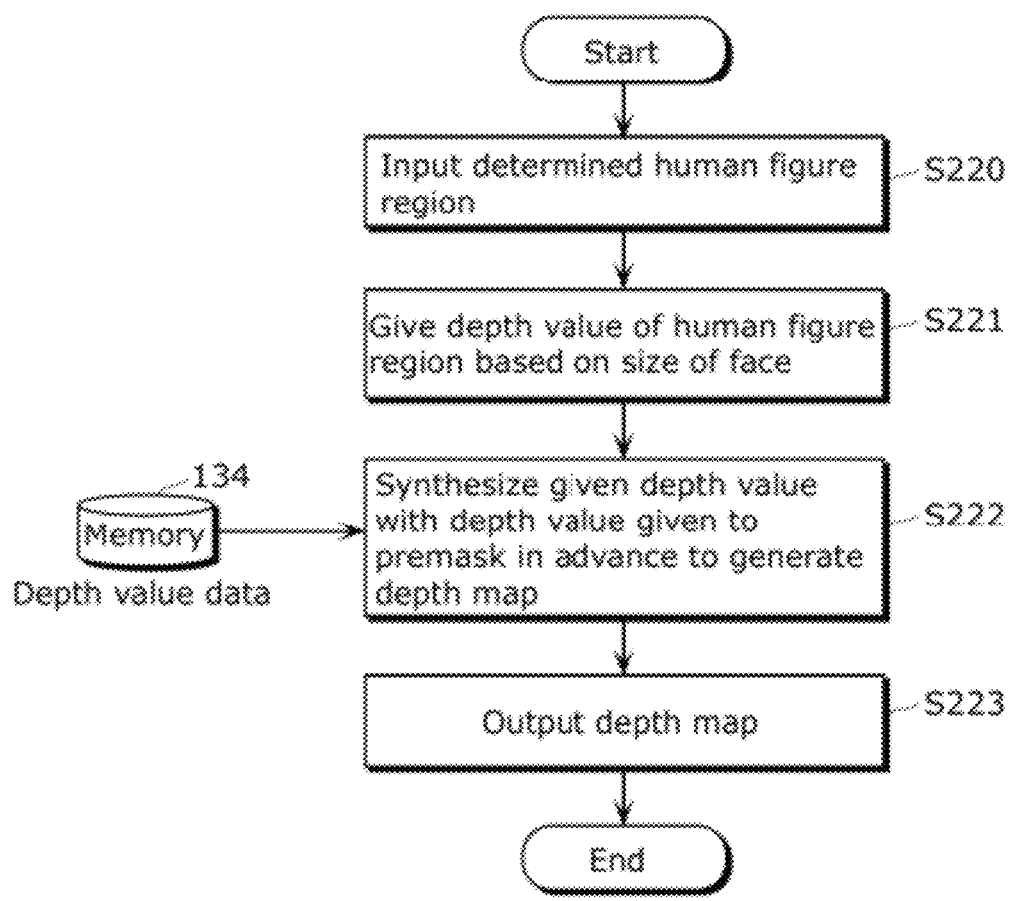
FIG. 11 is a flowchart for describing a processing by the depth map generating unit according to the embodiment of the present invention.
Figure 12A:
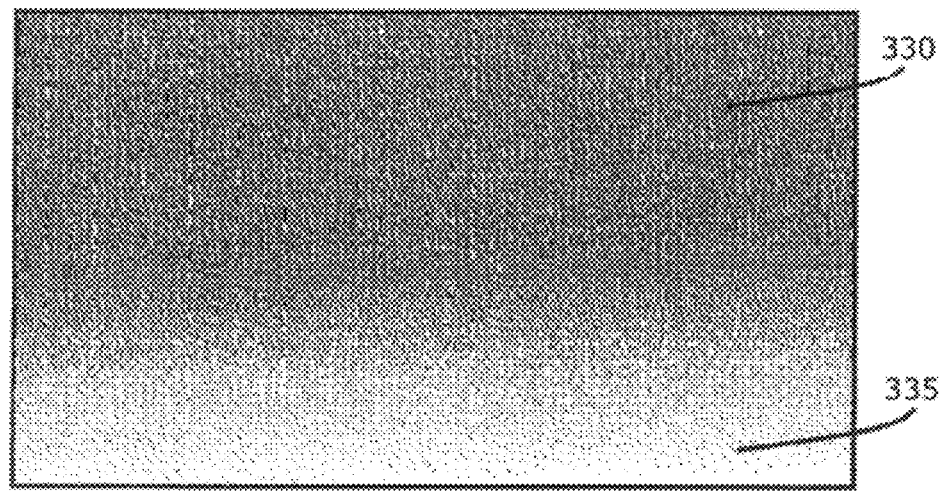
FIG. 12A is a drawing showing an example of a temporary depth map generated by the depth map generating unit according to the embodiment of the present invention.
Figure 12B:
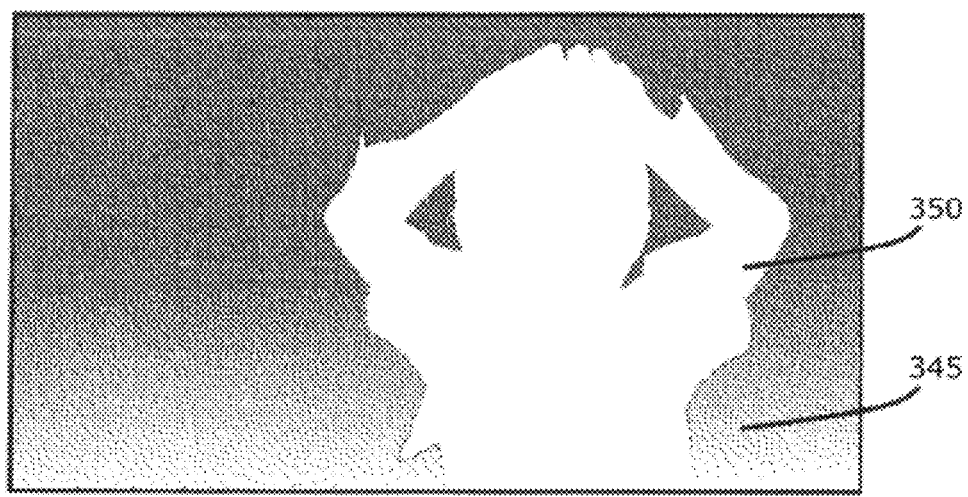
FIG. 12B is a drawing showing an example of a temporary depth map generated by the depth map generating unit according to the embodiment of the present invention.

FIG. 11 is a flowchart for describing the processing by the depth map generating unit 11 according to the embodiment of the present invention. FIGS. 12A and 12B are drawings showing a temporary depth map generated by the depth map generating unit 11 according to the embodiment of the present invention.

First, the human figure region determined by the region determining unit 106 is input to the depth map generating unit 11 (S220). For example, a frame including the human figure region 340 as shown in FIG. 8 is input to the depth map generating unit 11.

Next, based on the size and position of the human face detected by the face detecting unit 101 in the two-dimensional image, the giving unit 111 calculates the first depth value of the human figure region extracted by the region extracting unit 10. Then, the giving unit 111 gives the calculated first depth value to the human figure region (S221).

Namely, the giving unit 111 generates the temporary depth map for the human figure region extracted by the region extracting unit 10.

Here, the temporary depth map is generated on the basis of the concept of a basic depth model that is an estimate of a global depth value. The generated temporary depth map is composed of the human figure region extracted by the region extracting unit 10 and the first depth value given to the human figure region, and stored in the memory 134. Here, FIGS. 12A and 13B show an example of the temporary depth map. A depth value indicating a depth closer to the front of the camera is given to a lower portion 335 in the temporary depth map shown in FIG. 12A, and a depth value indicating a depth far from the camera is given to an upper portion 330 of the temporary depth map shown in FIG. 12.

In S221, the depth value for the human figure region is given based on the size of the face included in the human figure region. For example, the depth value indicates that the face is closer to the camera as a depth value to be given is larger, and the face is farther from the camera as the depth value is smaller. Moreover, a depth value different from that of the background (region other than the human figure region) is given to the human figure region. For example, a depth value indicating an object closer to the front of the camera is given to the human figure region 350 shown in FIG. 12B to obtain a pop-up effect, while a depth value indicating the object far from the camera is given to the lower portion 345 in the background.

Next, the synthesizing unit 112 synthesizes the second depth value given to the temporary human figure region (premask) first set by the temporary region setting unit 102 with the first depth value, thereby to generate and obtain the depth map that separates the human figure region from the region other than the human figure region (S222).

Namely, the synthesizing unit 112 synthesizes the depth value of the premask stored in advance in the memory 134 (second depth value) with the temporary depth map generated by the giving unit 111.

Thus, the depth map generating unit 11 generates the depth map used for separating the human figure region from the background.

Figure 13:
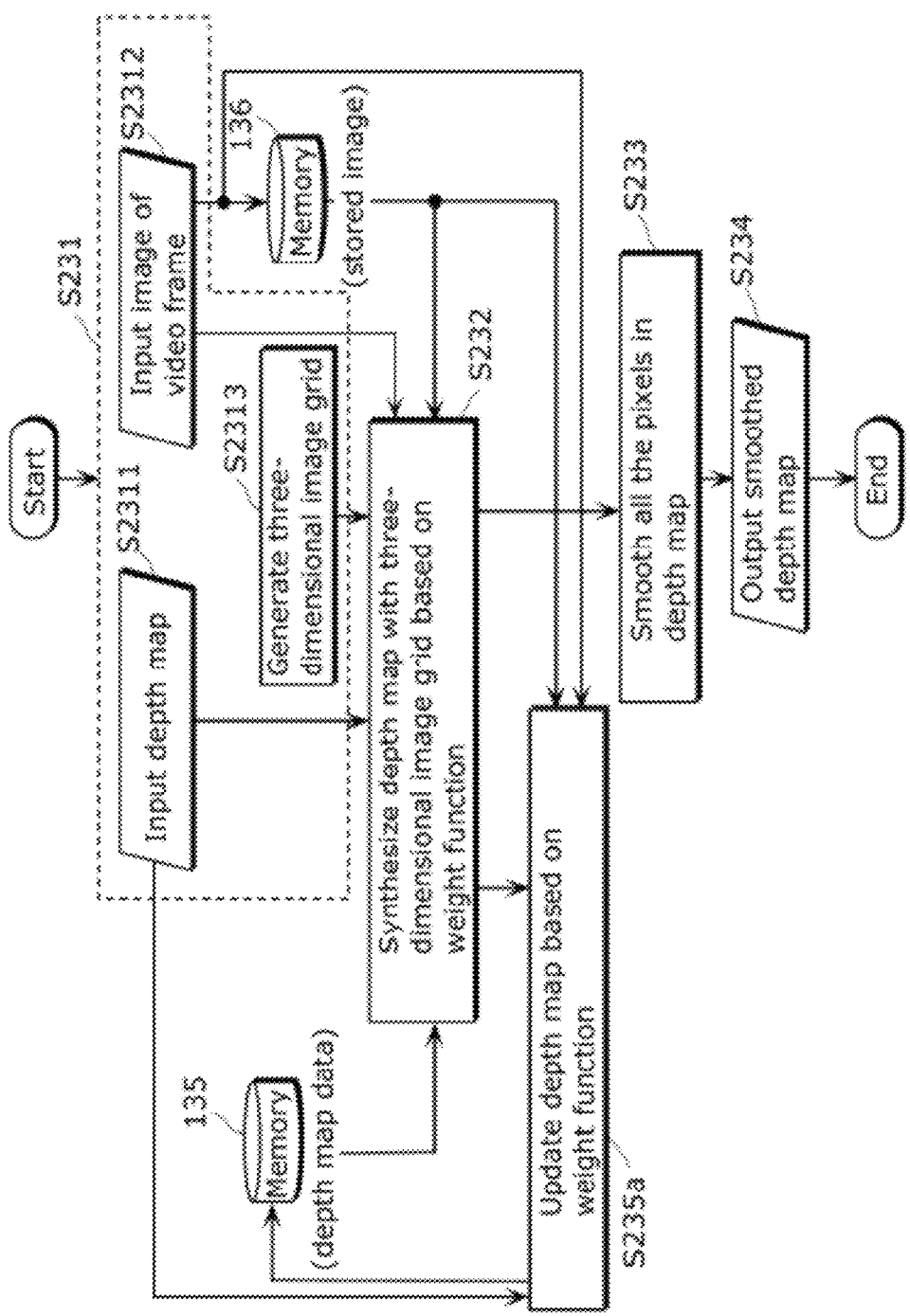
FIG. 13 is a drawing for describing a processing in a smoothing processing unit when a video is input to a depth information generating device according to the embodiment of the present invention.
Figure 14:
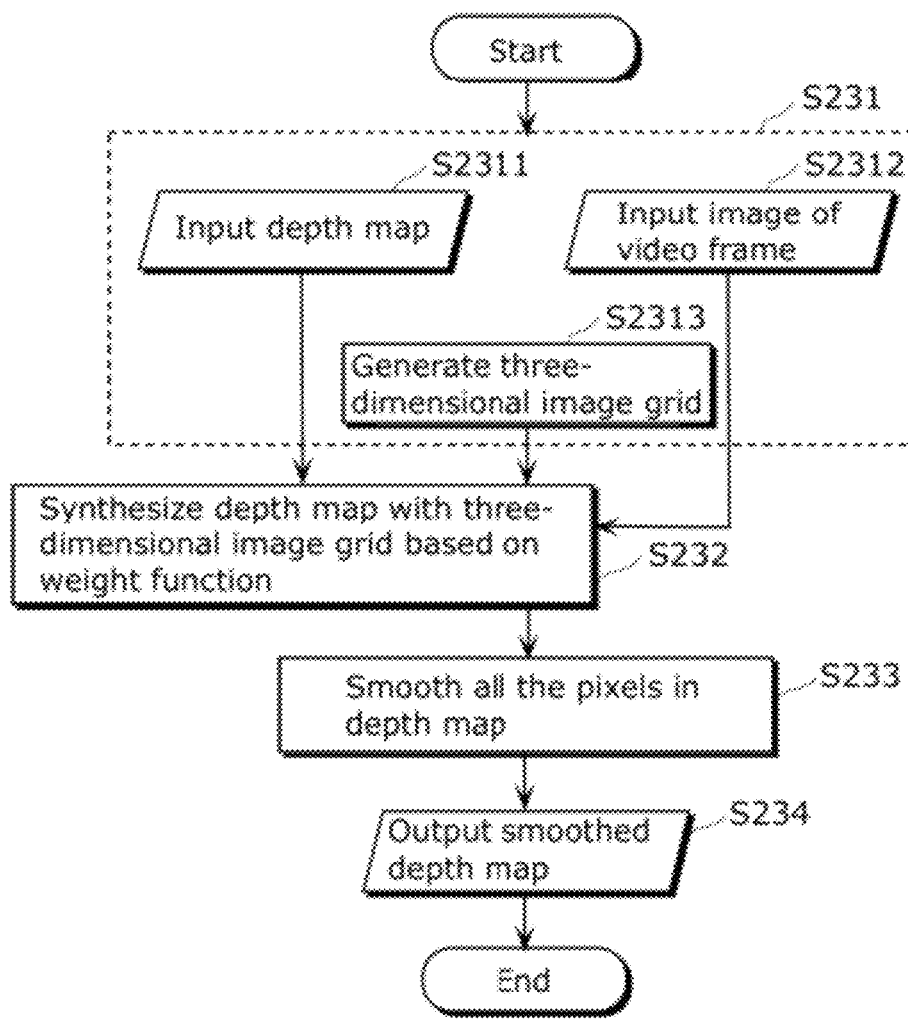
FIG. 14 is a drawing for describing a processing in the smoothing processing unit when a two-dimensional image is input to the depth information generating device according to the embodiment of the present invention.
Figure 15:
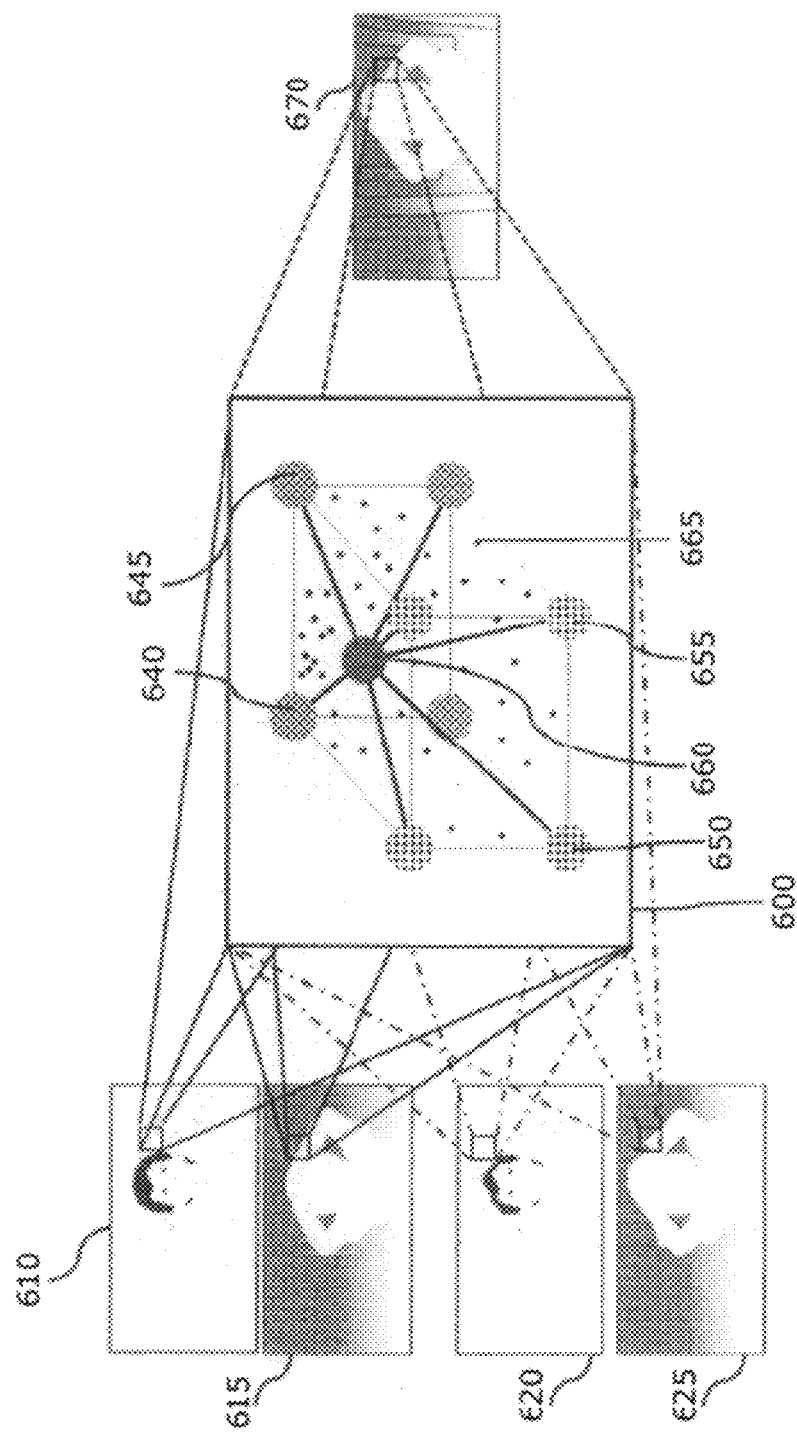
FIG. 15 is a drawing showing operation of filtering according to the embodiment of the present invention.
Figure 16:
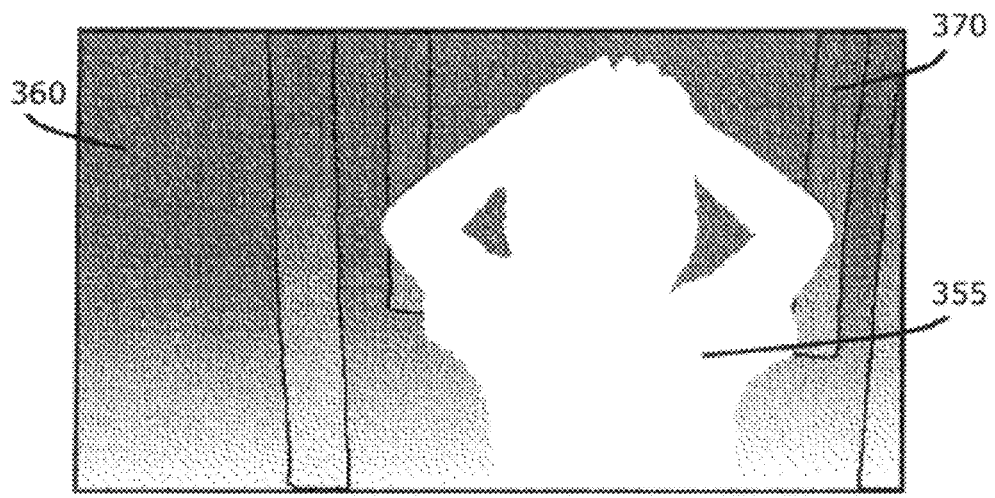
FIG. 16 is a drawing showing a manner of the depth map after the processing in the smoothing processing unit according to the embodiment of the present invention.

FIG. 13 is a drawing for describing the processing by the smoothing processing unit 12 when a video is input to the depth information generating device 1 according to the embodiment of the present invention. FIG. 14 is a drawing for describing the processing by the smoothing processing unit 12 when a two-dimensional image is input to the depth information generating device 1 according to the embodiment of the present invention. FIG. 15 is a drawing showing an operation of filtering according to the embodiment of the present invention. FIG. 16 is a drawing showing the manner of the depth map after the processing by the depth information generating device 1 according to the embodiment of the present invention.

FIG. 13 is a flowchart showing a spatial and temporal smoothing processing because the video is input to the depth information generating device 1, while FIG. 14 is a flowchart showing a spatial smoothing processing because the two-dimensional image is input to the depth information generating device 1. It can be said that the processing in FIG. 14 is part of the processing in FIG. 13. Accordingly, the processing in FIG. 13 will be described, and the description of that in FIG. 14 will be omitted below.

First, even if the region extracting unit 10 extracts the human figure region, often, a perfect shape of the human figure region may not be extracted, for example, as a boundary shape 325 shown in FIG. 8. For this, when a region that is not the human figure region is removed by filtering, a smoothing processing plays an important role particularly in the vicinity of the boundary shape of the human figure region based on an object layer in an image plane extracted from the two-dimensional image.

Specifically, in the smoothing processing unit 12, in S2313 in FIG. 13, a three-dimensional image grid 600 shown in FIG. 15 is generated on the basis of two-dimensional images in a target frame t and a preceding frame t−1, for example. Here, an x-y plane represents a spatial coordinate of the two-dimensional image, and a y axis represents an image layer extracted from the two-dimensional images in the target frame and the preceding frame.

Moreover, in S232, the depth maps of the target frame 625 and the preceding frame 615 stored in the memory 136 are applied to the three-dimensional image grid 600 based on the weight function of the two-dimensional image data of the target frame 620 and the preceding frame 610. Here, a method for applying a weighted value and the depth value of the target frame is represented as follows:

[Math. 1]

$r_t = \eta_d \times |D_t - D_{temp}|$, $GD(d) = GD(d) + r_t \times D_t$, $GW(d) = GW(d) + r_t$, Expression 1

In Expression 1, $r_t$ is a weighting ratio used in a method for applying the depth map of the target frame to the three-dimensional image grid, and is a normalization function for adjusting the value of $r_t$ in the range of [0, 1]. $D_t$ and $D_{temp}$ are the depth map of the target frame and the stored depth map of the preceding frame, respectively. GD(d) is a three-dimensional image grid included in depth data in the range d of the depth value. GW(d) is a three-dimensional image grid included in the weighted value of the depth data in the range d of the depth value.

A method for applying the depth data of the preceding frame stored in the memory 135 is expressed as follows:

[Math. 2]

$r_{t-1} = \eta_I \times |I_t - I_{t-1}|$, $GD(d) = GD(d) + r_{t-1} \times D_{temp}$, $GW(d) = GW(d) + r_{t-1}$, Expression 2

In Expression 2, $r_{t-1}$ is a weighting ratio used in a method for applying the depth map of the preceding frame stored in the memory 135 to the three-dimensional image grid. $\eta_I$ is a normalization function for adjusting the value of $r_{t-1}$ in the range of [0, 1]. $I_t$ and $I_{t-1}$ are the two-dimensional image data of the target frame and the two-dimensional image data of the preceding frame, respectively.

The preceding frame of the depth map in S235 is expressed as follows:

[Math. 3]

$w_{t-1} = \eta_I \times |I_t - I_{t-1}|$, $w_t = 1 - w_{t-1}$, $D_{temp} = w_t \times D_t + w_{t-1} \times D_{temp}$, Expression 3

In Expression 3, $w_t$ and $w_{t-1}$ are weighting ratios used in a method for storing the depth map of the target frame of and a method for storing the depth map of the stored frame $D_{temp}$, respectively.

In S233, the target frame using the calculated three-dimensional filter grid is spatially and temporally filtered, and tri-linear interpolation between image nodes including the pixels of the two-dimensional image in the target frame are determined. Thus, a new depth value for each pixel is calculated to obtain a final depth map (smoothed depth map).

Here, as an example of the smoothing processing. FIG. 15 shows how an edge-adaptive smoothing processing for the depth map is performed. Specifically, FIG. 15 shows a method for smoothing a depth map in a pixel p using the three-dimensional image grid 600.

First, the target frame 620 and the preceding frame 610 as the two-dimensional images are divided into blocks of a small size, and each of the small blocks forms the three-dimensional image grid 600. For example, a node 650 refers to a pixel located in the lower left corner of a small block in the two-dimensional image, and a node 655 refers to a pixel located in the lower right corner of the small block in the two-dimensional image. A node 640 refers to a pixel object layer in the upper left corner of the small block in the two-dimensional image, and a node 645 refers to a pixel object layer in the upper right corner of the small block in the two-dimensional image. Thus, the depth map of each pixel is adapted to the same reference point. Here, a pixel 665 is part of the small block, and an adapted pixel.

In the method, when a value of the object layer of any pixel that belongs to the same block is different from that of other pixel that belongs to the same block, the depth value of the pixel is included in an image grid different from an image grid in which the other pixel is included. A new pixel value in the depth map after smoothing is calculated using the trilinear interpolation in all the pixels belonging to the same block. Thereby, a pixel value is obtained from the density in the position of the pixel in the pixel grid. For example, a new value of the pixel in a position 660 (x+block_width/2,y+block_height/2) is calculated by determining the density according to the position within the image grid. By this configuration, the respective pixels can be separated from each other according to the information on the object layer.

Accordingly, errors such as the error produced in the depth map 325 that belongs to a different object layer are reduced because the depth value is included in a different image grid having a low depth data density. Namely, as shown in FIG. 16, in the depth map obtained after the smoothing, an imperfect shape of the human figure region such as the boundary shape 325 shown in FIG. 8 becomes natural by the smoothing. The depth map smoothed by the edge-adaptive smoothing processing includes a highly accurate human figure region depth map 355, a global background depth information 360, and a background depth information 370 as shown in FIG. 16.

When the depth map is generated from the two-dimensional image as shown in FIG. 14, a three-dimensional image grid 600 is formed using only a single two-dimensional image 620 in performing the edge-adaptive smoothing processing. Then, application to the image grid may be performed using the depth map of the target frame 625.

Thus, using at least the information on the two-dimensional image, the smoothing processing unit 12 performs smoothing of the edge of the human figure region in the depth map generated by the depth map generating unit 11.

As above, according to the depth information generating device 1 according to the present embodiment, a depth map for displaying a 3D pop-out from which a viewer feels no unnaturalness can be generated.

The depth information generating device 1 according to the present embodiment generates the depth map that separates the depth of the human figure from the background. The depth map to be generated is used for converting the two-dimensional image to the three-dimensional image.

In the above description, the depth information generating device 1 includes the region extracting unit 10, the depth map generating unit 11, and the smoothing processing unit 12, but is not limited thereto. As a minimal configuration of the depth information generating device 1, the depth information generating device 1 may include a minimal component unit 1A. Namely, the depth information generating device 1 may include the region extracting unit 10 and the depth map generating unit 11. The depth information generating device 1 includes at least the minimal component unit 1A. Thereby, the depth information generating device 1 can generate the depth map for displaying the 3D pop-out from which the viewer feels no unnaturalness.

Hereinafter, a device that includes the depth information generating device 1 and converts the two-dimensional image to the three-dimensional image will be described.

Figure 17:
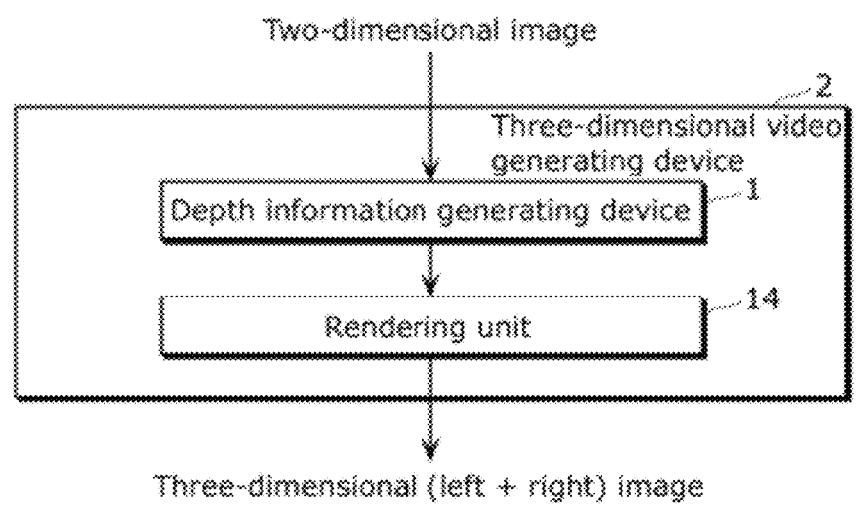
FIG. 17 is a functional block diagram of a three-dimensional video generating device according to the embodiment of the present invention.

FIG. 17 is a functional block diagram of a three-dimensional video generating device according to the embodiment of the present invention. A three-dimensional video generating device 2 shown in FIG. 17 corresponds to the stereo image converter according to the present invention, and includes the depth information generating device 1 and a rendering unit 14.

The rendering unit 14 converts the two-dimensional image into a stereo image using the depth map generated by the depth information generating device 1.

Here, the stereo image means a stereoscopic pair corresponding to the two-dimensional image and composed of a left eye image and a right eye image, or a multiview image corresponding to the two-dimensional image and composed of a plurality of images viewed from different viewpoints.

In the thus-configured three-dimensional video generating device 2, a natural and stress-free 3D pop-out effect is obtained in a variety of scenes because real-time operation can be performed efficiently with a small capacity of a memory and a boundary of an object can be automatically distinguished with high precision.

Figure 18:
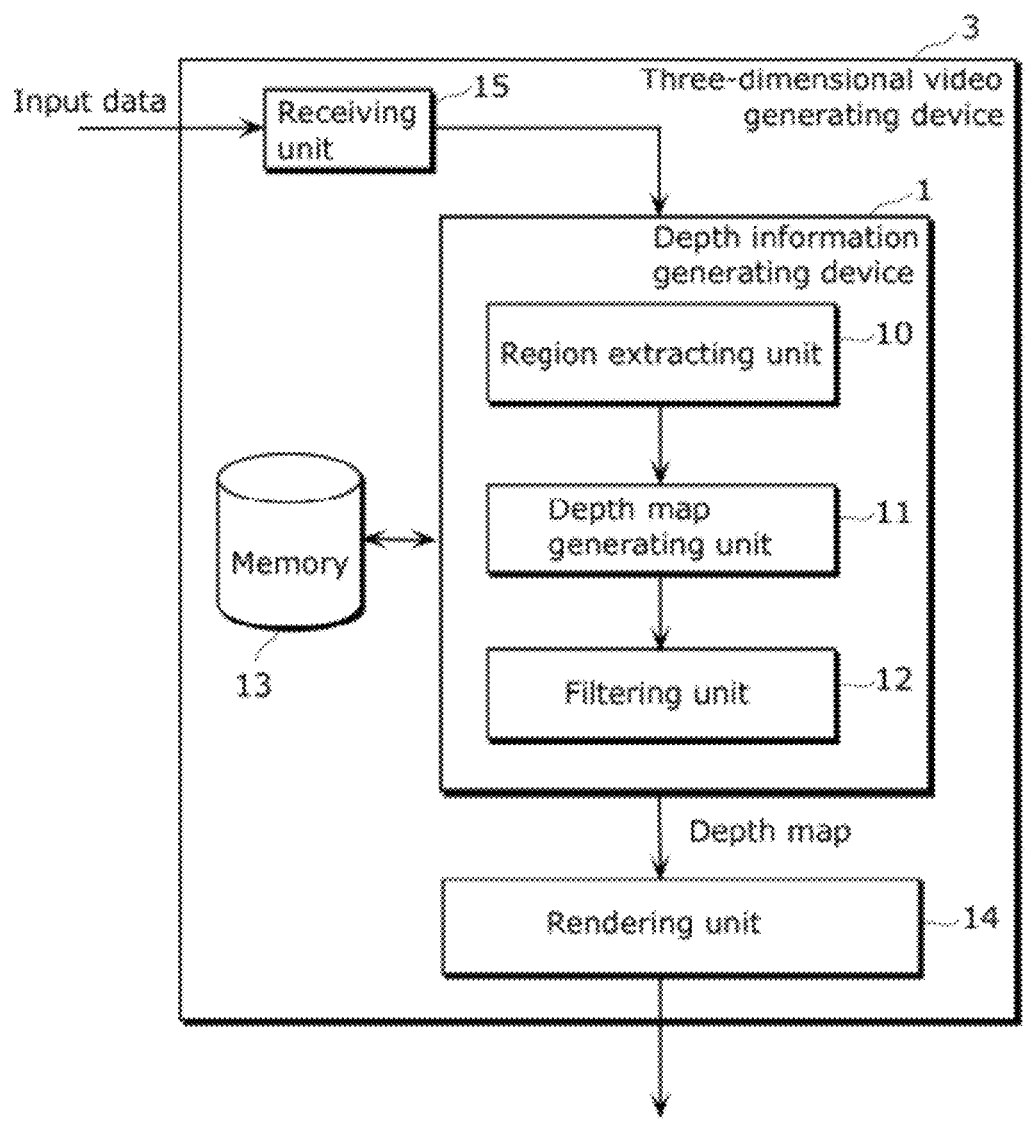
FIG. 18 is a functional block diagram of other example of the three-dimensional video generating device according to the embodiment of the present invention.

In the thus-configured three-dimensional video generating device 2, the two-dimensional image or video is directly input to the depth information generating device 1, but the input method is not limited to this. For example, as shown in FIG. 18, the two-dimensional image or video may be input via a receiving unit 15. Here, FIG. 18 shows another example of a functional block diagram of the three-dimensional video generating device according to the embodiment of the present invention.

A three-dimensional video generating device 3 shown in FIG. 18 further includes the receiving unit 15 unlike the three-dimensional video generating device 2 shown in FIG. 17. Except that, the three-dimensional video generating device 3 has the same configuration as that in FIG. 17, and detailed description thereof will be omitted. In FIG. 18, same reference numerals are given to same elements as those in FIGS. 1 and 16.

The receiving unit 15 receives designated data designated by a user. A two-dimensional image or video is input to the receiving unit 15, which outputs the two-dimensional image or video to the depth information generating device 1. Here, the designated data indicates a focused target region designated by the user. The interest object means the human figure region.

As above, according to the present embodiment, a depth information generating device, a depth information generating method, and a stereo image converter can be attained in which a depth map for displaying a 3D pop-out from which a viewer feels no unnaturalness can be generated.

For example, in the stereo image converter having the depth information generating device and the depth information generating method according to the present embodiment, a highly accurate human figure region can be automatically generated, and the 3D pop-out effect can be provided substantially in real-time when the 2D image is converted to the 3D image or 3D video. The user does not always need to designate the target (human figure) manually. This is because a highly accurate foreground region and human figure region can be extracted from any two-dimensional image, and a depth map that meets the human perception of the 3D effect can be generated.

Thus, in the stereo image converter having the depth information generating device and the depth information generating method according to the present embodiment, a natural and stress-free 3D pop-out effect is obtained in a variety of scenes because real-time operation can be performed efficiently with a small capacity of a memory and a boundary of an object can be automatically distinguished with high precision.

(Modification 1)

In the description of the embodiment above, the region extracting unit 10 extracts the human figure region, but the object to be extracted is not limited thereto. The object to be extracted is not limited to the human figure as long as it can be statistically detected. For example, an object detectable by a computer and including at least one of a cat, a dog, a bird, and a food may be extracted as the interest object instead of the human figure region.

In this case, specifically, the following configuration may be used. Namely, the region extracting unit 10 may include a target region detecting unit, a temporary region setting unit, and a region determining unit. The region extracting unit 10 may detect the target region from the two-dimensional image, the target region being a region statistically detectable in the interest object. Based on the detected target region, the region extracting unit 10 may extract the interest object region within the region in the two-dimensional image.

Here, the target region detecting unit detects the target region in the two-dimensional image. Based on the position of the detected target region, the temporary region setting unit sets a temporary interest object region, which is a region of an interest object model including a region of the detected target region. Based on the feature of the temporary interest object region and the feature of a pixel adjacent to the temporary interest object region, the region determining unit updates the range of the temporary interest object region to determine the interest object region. The interest object is an object detectable by a computer and including at least one of a cat, a dog, a bird, and a food.

In this case, using the information on the two-dimensional image, the smoothing processing unit 12 smoothes the edge of the interest object region in the depth map generated by the depth map generating unit.

Similarly to the embodiment above, the three-dimensional video generating device 2 and the three-dimensional video generating device 3 may include a depth information generating device including the region extracting unit 10 according to Modification 1. In this case, the receiving unit 15 receives the designated data designated by the user. Here, the designated data indicates the focused target region designated by the user. Based on the designated data, the region extracting unit 10 detects the target region from the designated interest object region. Namely, based on the designated data, the target region detecting unit detects the target region in the two-dimensional image, and specifies the position of the target region.

For example, in the depth map generating unit 11, based on the size and position of the target region detected by the target region detecting unit in the two-dimensional image and the designated data from the user to be input, the giving unit 111 calculates the first depth value of the interest object region extracted by the region extracting unit 10. Then, the giving unit 111 gives the calculated first depth value to the interest object region. The synthesizing unit 112 synthesizes the second depth value given to the temporary interest object region set by the temporary region setting unit with the first depth value, thereby to generate a depth map that separates the interest object region from a region other than the interest object region.

(Modification 2)

In the embodiment above, the region extracting unit 10 detects the human face from the input two-dimensional image or the two-dimensional image that forms the input video, and based on the detected face, extracts the human figure region indicating a human figure within the region in the two-dimensional image, but the present embodiment will not be limited to this.

Figure 19:
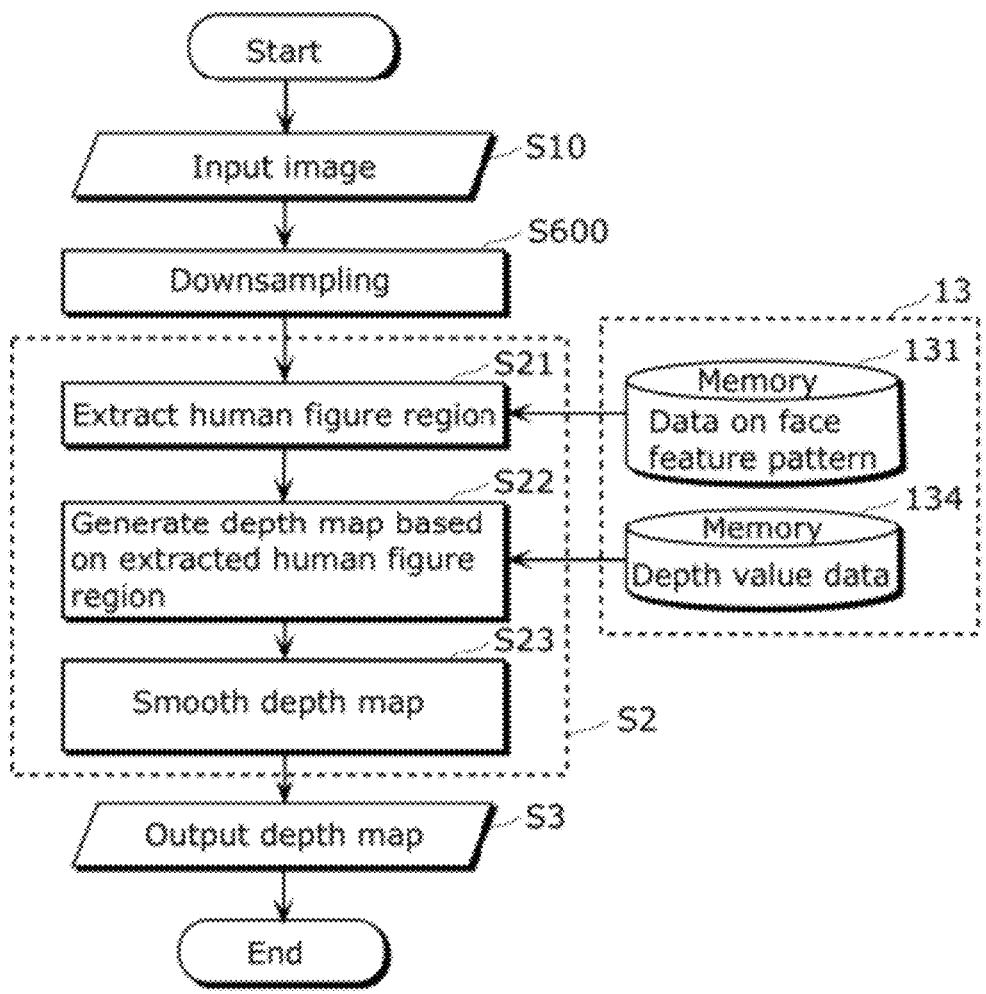
FIG. 19 is a flowchart for describing an outline of a processing by a depth information generating device according to Modification 2 of the embodiment of the present invention.
Figure 20:
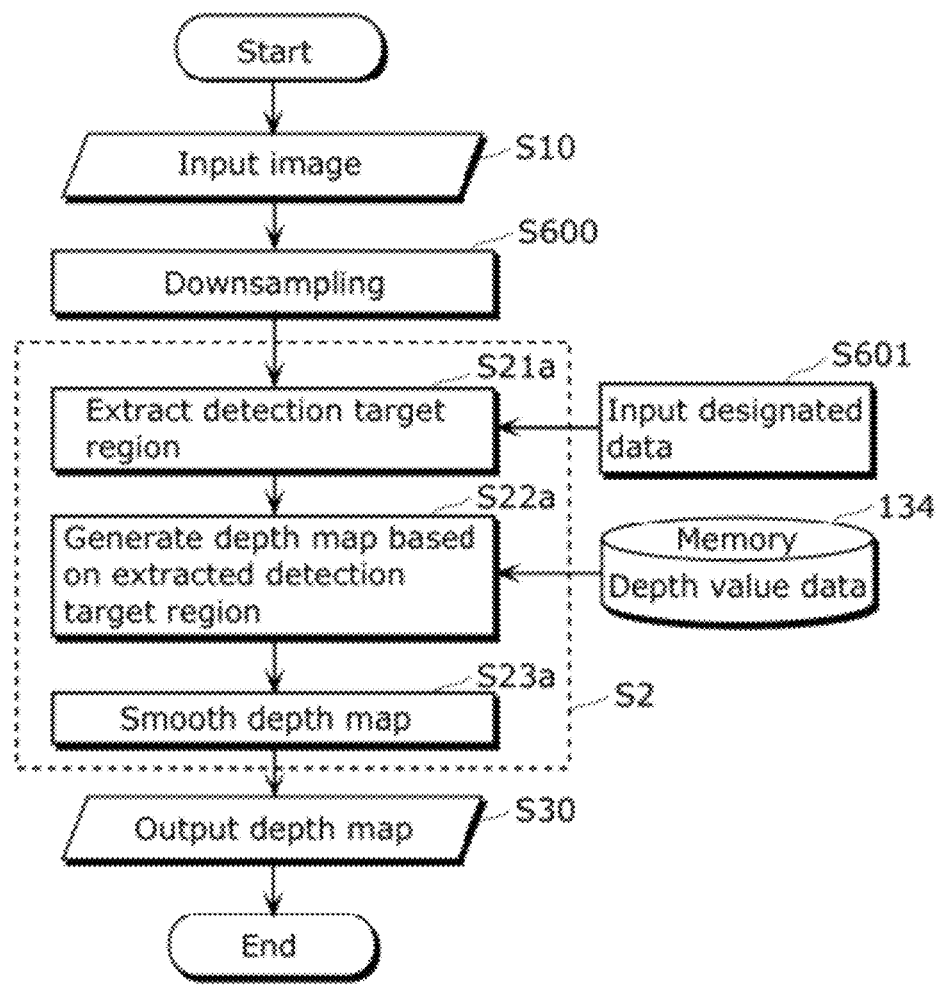
FIG. 20 is a flowchart for describing an outline of a processing by the depth information generating device according to Modification 2 of the embodiment of the present invention.
Figure 21:
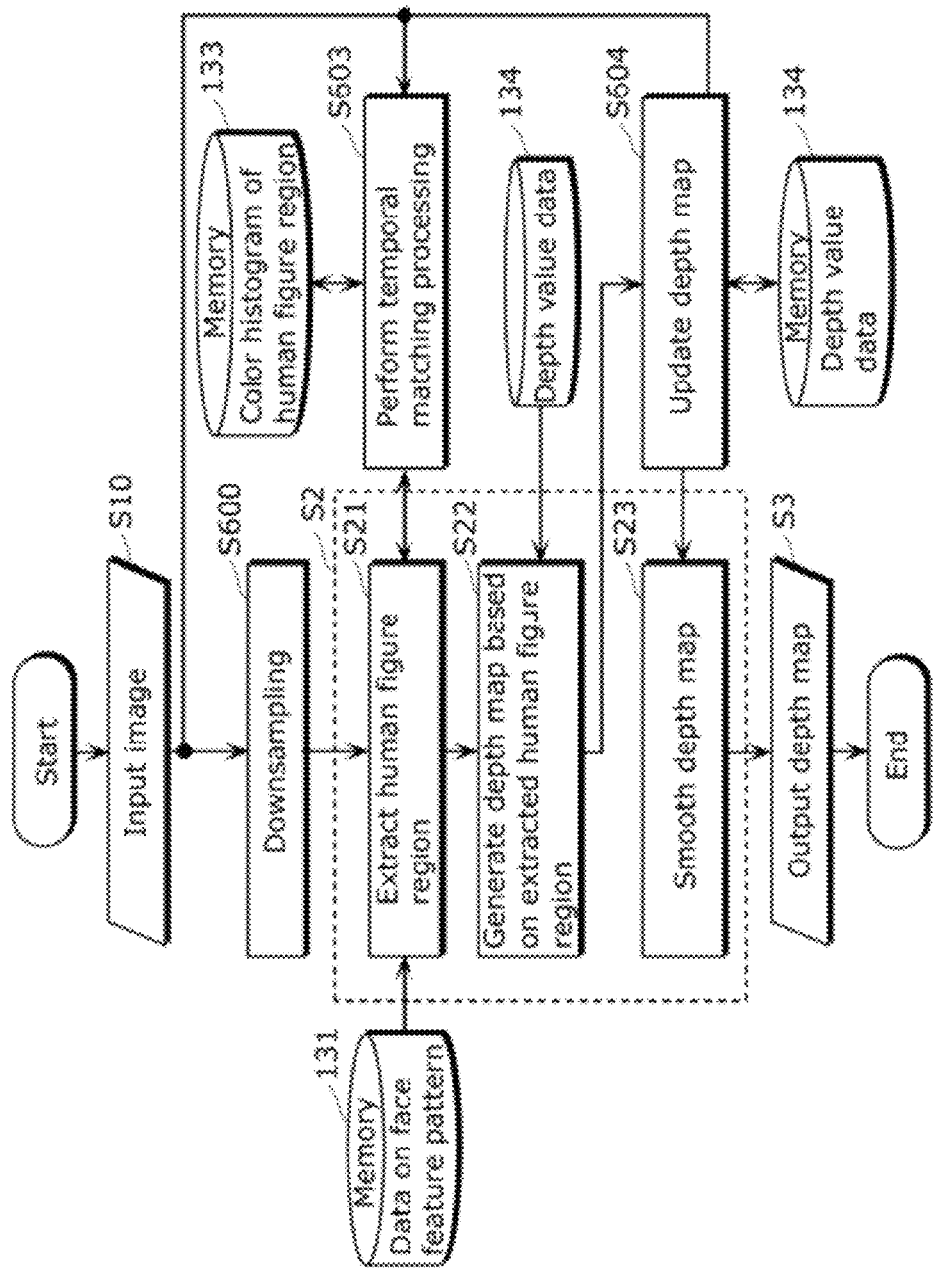
FIG. 21 is a flowchart for describing an outline of a processing by the depth information generating device according to Modification 2 of the embodiment of the present invention.

As shown in FIGS. 19 to 21, in order to optimize a detection rate that is a rate for detecting the target region such as the face by the region extracting unit 10, the input two-dimensional image or the two-dimensional image that forms the input video may be downsampled.

Here, FIGS. 19 to 21 are flowcharts for describing an outline of the processing by a depth information generating device according to Modification 2 of the embodiment of the present invention. Same referential numerals are given to same elements as those in FIG. 2, and the detailed description thereof will be omitted.

FIG. 19 shows an outline of the processing when the two-dimensional image is input to the region extracting unit 10, and downsampled, and the face region is detected. FIG. 20 shows an outline of the processing when the two-dimensional image is input to the region extracting unit 10, and downsampled, and the target region of a dog or a cat other than the face is detected. FIG. 21 shows an outline of the processing when the video (two-dimensional image that forms the video) is input to the region extracting unit 10, and downsampled, and the face detection is performed.

Unlike FIG. 2, a downsampling processing (S600) is added in FIG. 19. Namely, in S600, the input two-dimensional image is downsampled in order to detect the proper size of the face and optimize the detection rate. Here, for example, the input two-dimensional image is downsampled into $\frac{1}{16}$ of the size of the input two-dimensional image.

Subsequently, in S21, based on data on the face feature pattern 131 stored in the memory 13, the face detection is performed on the downsampled two-dimensional image using a human face detection algorithm.

Unlike FIG. 2, a downsampling processing (S600) is added and the detection target is not the face but the target region other than the face of a dog or the like in FIG. 20. For example, in S600, in order to detect only a proper size of the target region and optimize the detection rate, the input two-dimensional image is downsampled. Here, for example, the input two-dimensional image is downsampled into $\frac{1}{16}$ of the size of the two-dimensional image.

Subsequently, in S21a, in the downsampled two-dimensional image, the target region is detected on the basis of the designated data input by the user at S601 according to a detection algorithm for detecting a target region.

Unlike FIG. 2, a video (two-dimensional image that forms the video) is input to the region extracting unit 10 and the downsampling processing (S600) is added in FIG. 21. For example, in S600, in order to detect only a proper size of the target region and optimize the detection rate, the input two-dimensional image is downsampled. Here, for example, the input two-dimensional image is downsampled into $\frac{1}{16}$ of the size of the two-dimensional image.

Subsequently, in S21a, in the downsampled two-dimensional image, the target region is detected on the basis of the designated data input by the user at S601 according to a detection algorithm for detecting a target region. When the video is input to the region extracting unit 10, the face detection is not always successful. Accordingly, in the processings in S603 and S604, tracing of the human figure region (temporal matching of the human figure region) is performed to prevent a flicker from occurring in a 3D video to be generated later. The processings in S603 and S604 are as described in S217, S218, and the like, and the description thereof will be omitted.

As shown in FIG. 21, the basic depth structure of a scene that is a section of the video of an action in a fixed place is estimated. The object is extracted from the two-dimensional image that forms the video. The depth value is given to the object. Thereby, the depth map is generated and output.

(Modification 3)

In the description of the present embodiment, first, in the region extracting unit 10, using the color information such as the color histogram, the human figure region in the two-dimensional image is discriminated from the region other than the human figure region (background) thereof. A depth value different from that of the background is given to the discriminated human figure region to generate the depth map. The present invention will not be limited to this. Further, the depth values to be given to the background and the human figure region respectively may be changed according to the feature of the region to improve the 3D pop-out effect (sense of depth) of the background or the human figure region.

Figure 22:
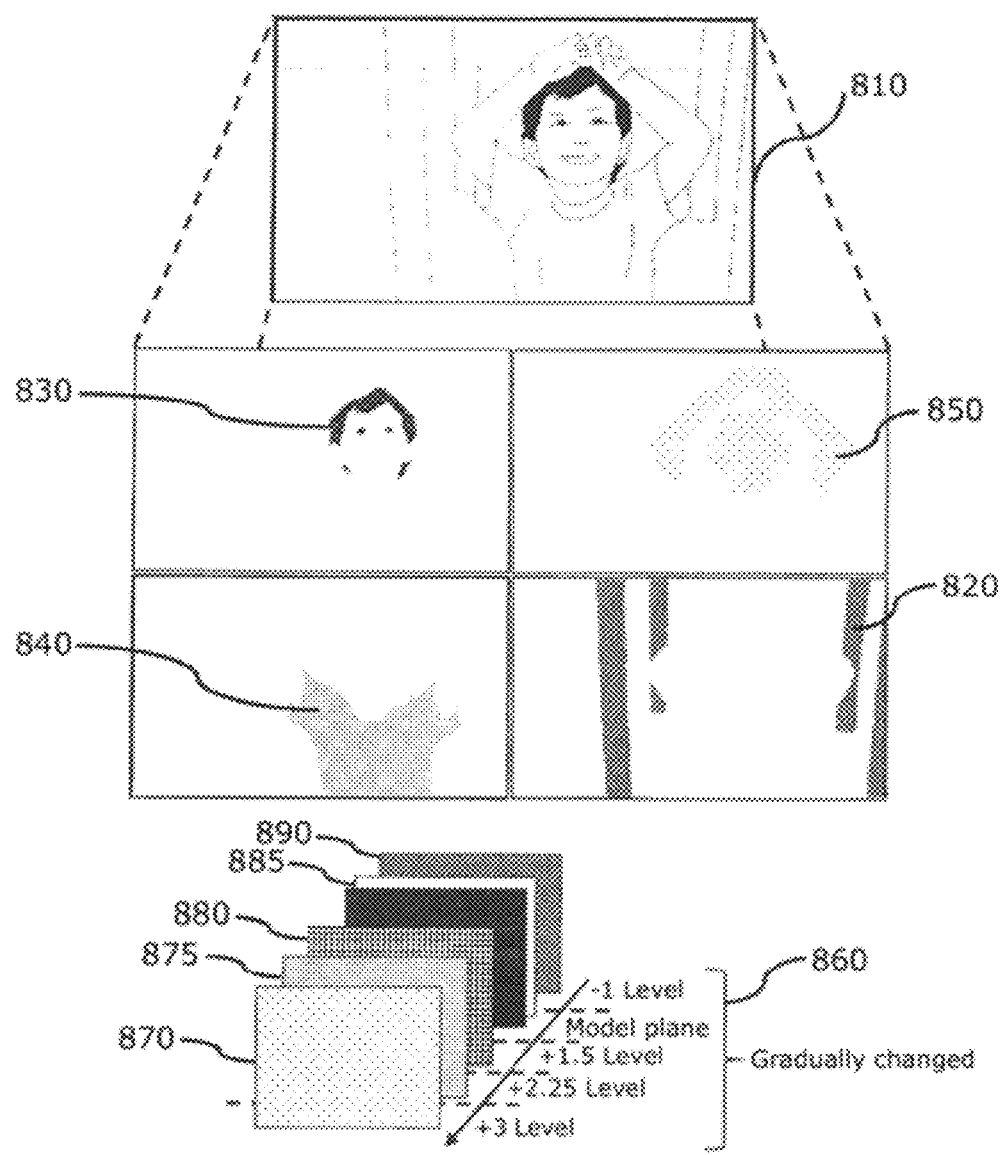
FIG. 22 is a drawing showing an example of a processing to extract a human figure region and background of a two-dimensional image so as to segment the human figure region and background into different layers on the basis of color information.

FIG. 22 is a drawing showing an example of a processing to extract the human figure region and the background in the two-dimensional image such that the human figure region and the background are divided into different layers based on the color information.

Using a method for extracting an interest object region such as the human figure region from a two-dimensional image, an additional depth value is generated to improve the depth of the interest object separated from a plane indicating the background.

For example, FIG. 22 shows an example of a processing when the human figure region and the background in a two-dimensional image 810 to be input are divided into different layers based on the color information.

Namely, first, the two-dimensional image 810 is divided into four image planes of different colors based on the color information to obtain color plane layers including a background plane 820 (including a color of dark red), a hair plane 830 (including a color of black), a coach plane 840 (including a color of yellow), and a skin plane 850 (a skin color).

Next, in order to separate the obtained color plane layers from each other, different depth values are given to color model planes 860 corresponding to the obtained color plane layers.

In the present invention, in order to improve the 3D effect of the human figure region, the human figure region is extracted, and the depth map is generated. For this reason, in the present Modification, the depth value is specified such that the user feels the region of the skin color (red color model plane 870/yellow color model plane 875) more frontward than the region of other color. Moreover, the depth value is specified such that the user feels the regions of a green color model plane 880, a black and white color model plane 885, and a blue color model plane 890 more backward than the region of the skin color. Thus, the 3D pop-out effect (sense of depth) of the background or the human figure region can be improved. Here, for example, depth values of +1.5 level, 0, and −1 level are specified in the color model planes specified as the background such as the green color model plane 880, the black and white color model plane 885, and the blue color model plane 890. The level value can be adjusted according to an input parameter.

(Modification 4)

In the embodiment above, as an example of the stereo image converter having the depth information generating device and depth information generating method according to the present embodiment, the three-dimensional video generating device 2 and the three-dimensional video generating device 3 have been described, but the present invention will not be limited to this.

As another example of application, a 3D image display control device including the three-dimensional video generating device 2 and the three-dimensional video generating device 3 is also included in the scope of the present invention. Hereinafter, the 3D image display control device will be described.

Figure 23:
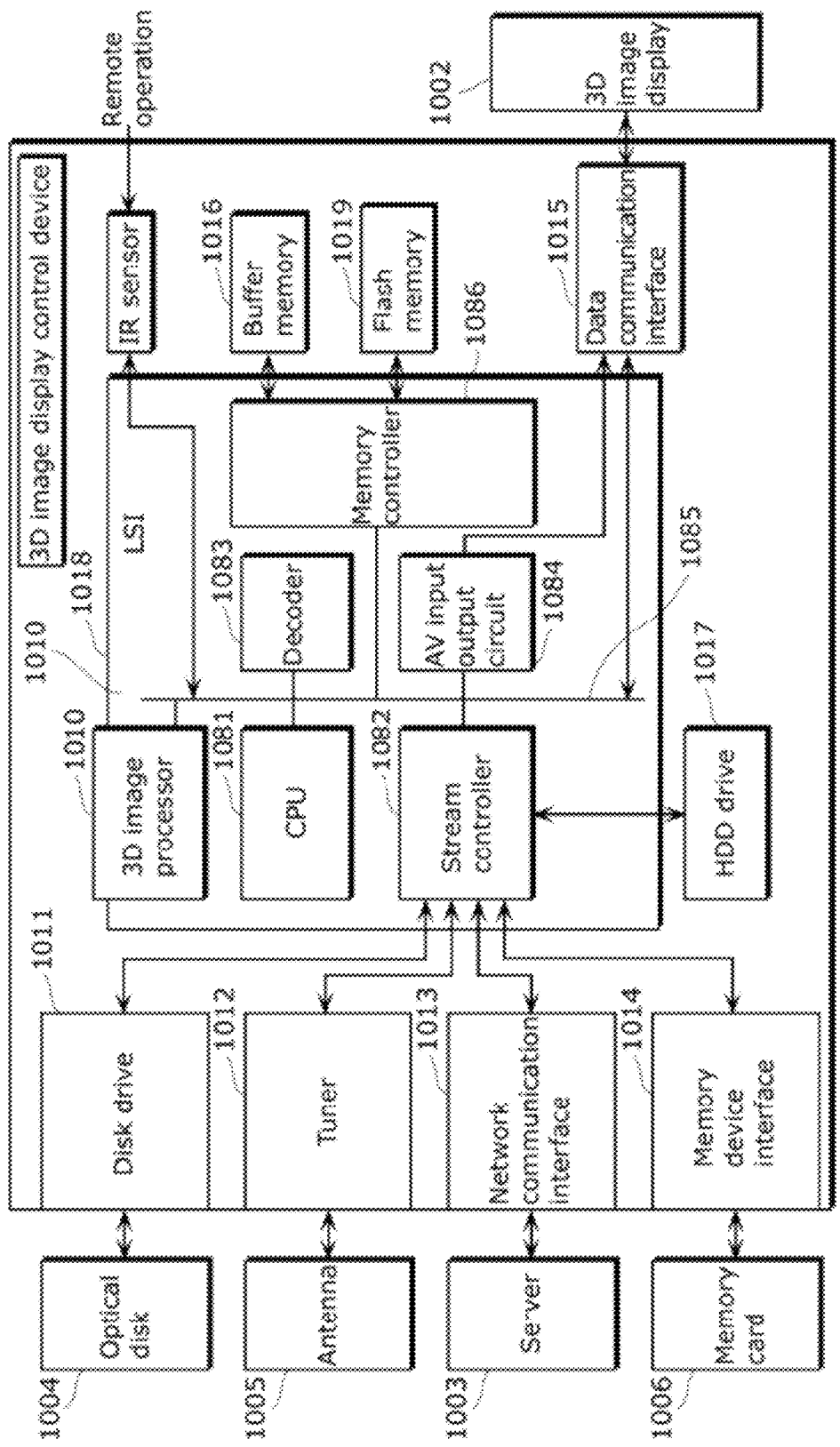
FIG. 23 is a drawing showing a functional block diagram of a 3D image display control device according to Modification 4 of the embodiment of the present invention.

FIG. 23 is a drawing showing a functional block diagram of a 3D image display control device according to Modification 4 of the embodiment of the present invention.

The 3D image display control device shown in FIG. 23 includes a disk drive 1011, a tuner 1012, a network communication interface 1013, a memory device interface 1014, a data communication interface 1015, a buffer memory (frame memory) 1016, a HD drive 1017, a flash memory 1019, and an LSI 1018.

The disk drive 1011 includes an optical pickup device, and reads a three-dimensional image (3D image) stream or two-dimensional image (2D image) stream from the optical disk 1004. The disk drive 1011 is connected to the LSI 1018 to transmit the 2D image stream or 3D image stream from the optical disk 1014 to the LSI 1018. The disk drive 1011 reads the 2D image stream or 3D image stream from the optical disk 1004 according to control from the LSI 1018, and transmits the stream to the LSI 1018.

The tuner 1012 obtains a broadcast wave including the 2D or 3D image stream received by the antenna 1005. The tuner 1012 extracts the 2D image stream or 3D image stream having a frequency specified by the LSI 1018 from the obtained broadcast wave. The tuner 1012 is connected to the LSI 1018 to transmit the extracted 2D image stream or 3D image stream to the LSI 1018.

The network communication interface 1013 may be connected to the server 1003 via a network. The network communication interface 1013 obtains the 2D or 3D image stream transmitted from the server 1003.

The memory device interface 1014 is configured such that the memory card 1006 is inserted into the memory device interface 1014. The 3D image stream or 2D image stream can be read from the inserted memory card 1006. The memory device interface 1014 transmits the 2D image stream or 3D image stream read from the memory card 1006 to the LSI 1018.

The HD drive 1017 includes a recording medium such as a hard disk, and transmits the data read from the recording medium to the LSI 1018. The HD drive 1017 records the data received from the LSI 1018 in the recording medium.

The data communication interface 1015 is an interface that transmits the data transmitted from the LSI 1018 to an external 3D image display apparatus 1002. The data communication interface 1015 can transmit and receive the data signal and the control signal to and from the 3D image display apparatus 1002. Accordingly, the LSI 1018 can control the 3D image display apparatus 1002 via the data communication interface 1015. The data communication interface 1015 can be implemented by an HDMI connector, for example. The data communication interface 1015 may have any configuration as long as it can transmit the data signal to the 3D image display apparatus 1002.

The LSI 1018 is a system controller that controls each section of the 3D image display control device. The LSI 1018 may be a microcomputer or a wiring circuit.

A CPU 1081, a stream controller 1082, a decoder 1083, an AV input output circuit 1084, a system bus 1085, and a memory controller 1086 are packaged in the LSI 1018.

The CPU 1081 controls the whole LSI 1018. The respective sections of the LSI 1018 perform various controls such as control of the LSI 1018. The CPU 1081 also controls the communication with the outside.

When the CPU 1081 obtains the 2D image stream or 3D image stream from the server 1003, the CPU 1081 transmits the control signal to the disk drive 1011, the tuner 1012, the network communication interface 1013, or the memory device interface 1014. For this reason, the disk drive 1011, the tuner 1012, the network communication interface 1013, and the memory device interface 1014 can obtain the 2D image stream or 3D image stream from the recording medium or a broadcasting station. When the image input stream is a 2D image, according to control of the user via an IR sensor, the CPU controls the 3D image processor to convert the image stream into a 3D image.

The stream controller 1082 controls transmission and reception of the data in the server 1003, the optical disk 1004, the antenna 1005, the memory card 1006, and active shutter glasses 1007.

When the decoder 1083 obtains the data from the memory controller 1086, the decoder 1083 decodes the obtained data. The data to be input to the decoder 1083 is based on control by the CPU 1081. Specifically, the CPU 1081 controls the memory controller 1086, and the memory controller 1086 reads the 3D image stream recorded in the buffer memory 1016. The CPU 1081 controls the memory controller 1086, and the memory controller 1086 transmits the 3D image stream recorded in the buffer memory 1016 to the decoder 1083. Accordingly, the 2D or 3D image stream is input from the memory controller 1086 to the decoder 1083.

The decoder 1083 decodes the compressed 2D or 3D image stream based on the decoding information included in the 2D or 3D image stream. The decoder 1083 transmits the decoding information to the memory controller 1086. The memory controller 1086 records the obtained information in the buffer memory 1016

The AV input output circuit 1084 reads the information from the buffer memory 1016, and generates the display image to be displayed in the 2D or 3D image display apparatus 1002. The AV input output circuit 1084 transmits the generated display image via the data communication interface 1015 to the 2D image stream or 3D image display apparatus 1002.

The 3D image processor 1010 corresponds to the three-dimensional video generating device 2 or the three-dimensional video generating device 3. These functions of three-dimensional video generating device 2 or the three-dimensional video generating device 3 are incorporated into the 3D image processor 1010, and used to convert the input 2D image to the 3D image. Specifically, the 3D image processor includes the function of the depth information generating device 1 and that of the rendering unit 14. The function of the rendering unit 14 is used to generate the 3D image from the 2D image and the depth map as described above.

The 3D image processor 1010, a depth generating module 1110, and an internal module are usually implemented in a form of an integrated circuit (IC), an application specific integrated circuit (ASIC), an large-scale integrated circuit (LSI), and a digital signal processor (DSP). These modules may be composed of several chips, or composed of a single chip. The integrated circuit is called an LSI here, but may also be referred to as an IC, a system LSI, a super LSI, or an ultra LSI depending on the integration density. Further, a method for implementing integration is not limited to the LSI, and a dedicated circuit or a general purpose processor may be used for the integration. These include a specialized microprocessor such as a digital signal processor (DSP) that can be controlled by a command of a program. The Field Programmable Gate Array (FPGA) which is programmable after building the LSI, or the reconfigurable processor which allows the LSI to be reconnected and reconfigured may be used for the same application. In the future, production and processing techniques will be improved, and the LSI may be replaced by a totally new technique. The integration can be attained by the new technique.

As above, according to the present invention, a depth information generating device, a depth information generating method, and a stereo image converter can be attained in which a depth map for displaying a 3D pop-out from which a viewer feels no unnaturalness can be generated.

Moreover, according to the present invention, when the depth map is generated using the video, the face detection is not always successful. Accordingly, tracing of the human figure region (temporal matching of the human figure region) is performed to prevent a flicker from occurring in a 3D video to be generated later.

Figure 24:
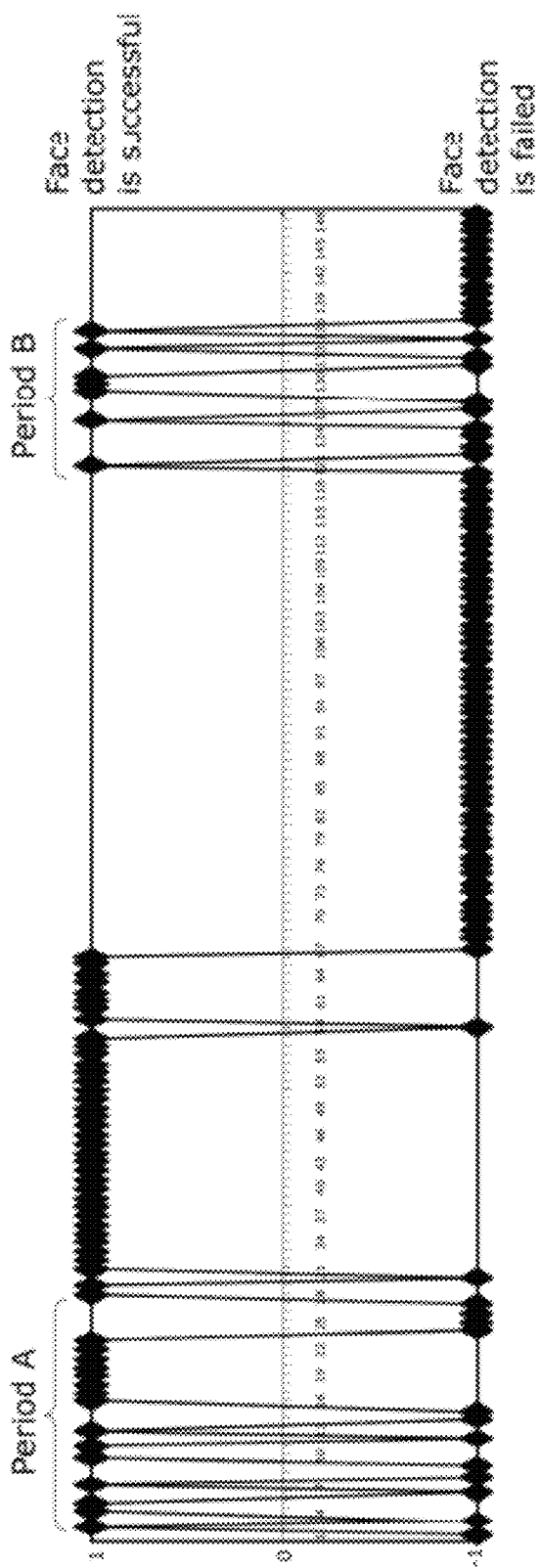
FIG. 24 is a drawing showing that a flicker occurs when temporal matching of the human figure region is not performed.

For example, FIG. 24 is a drawing showing occurrence of a flicker when the temporal matching of the human figure region is not performed. Here, the abscissa shows a continuous two-dimensional image (frame), and the ordinate shows whether the face detection is successful or not wherein the face detection is successful at a value of 1 and is failed at a value of −1. As shown in FIG. 24, when the temporal matching of the human figure region is not performed, it is found that in the Period A and the Period B, switching frequently happens between the frame in which the face detection is successful (frame having a value of 1 in the ordinate) and the frame in which the face detection is failed (frame having a value of −1 in the ordinate).

Contrary to this, as in the present invention, the temporal matching of the human figure region is performed to prevent a flicker from occurring in a 3D video to be generated later. Thereby, the frame in which the face detection is failed is eliminated in the Period A and the Period B as long as the human figure has a similar feature. Accordingly, the flicker can also be suppressed in the 3D video.

Thus, according to the depth information generating device, depth information generating method, and stereo image converter according to the present invention, a natural and stress-free 3D pop-out effect is obtained in a variety of scenes because real-time operation can be performed efficiently with a small capacity of a memory and a boundary of an object can be automatically distinguished with high precision.

Another effect of the present invention is that the human figure region is obtained using only the face detection. Accordingly, the present invention uses the capacity of the memory smaller than that in the method disclosed in PTL 3. Further, the present invention can be used for real-time applications because of a small time lag.

Figure 25:
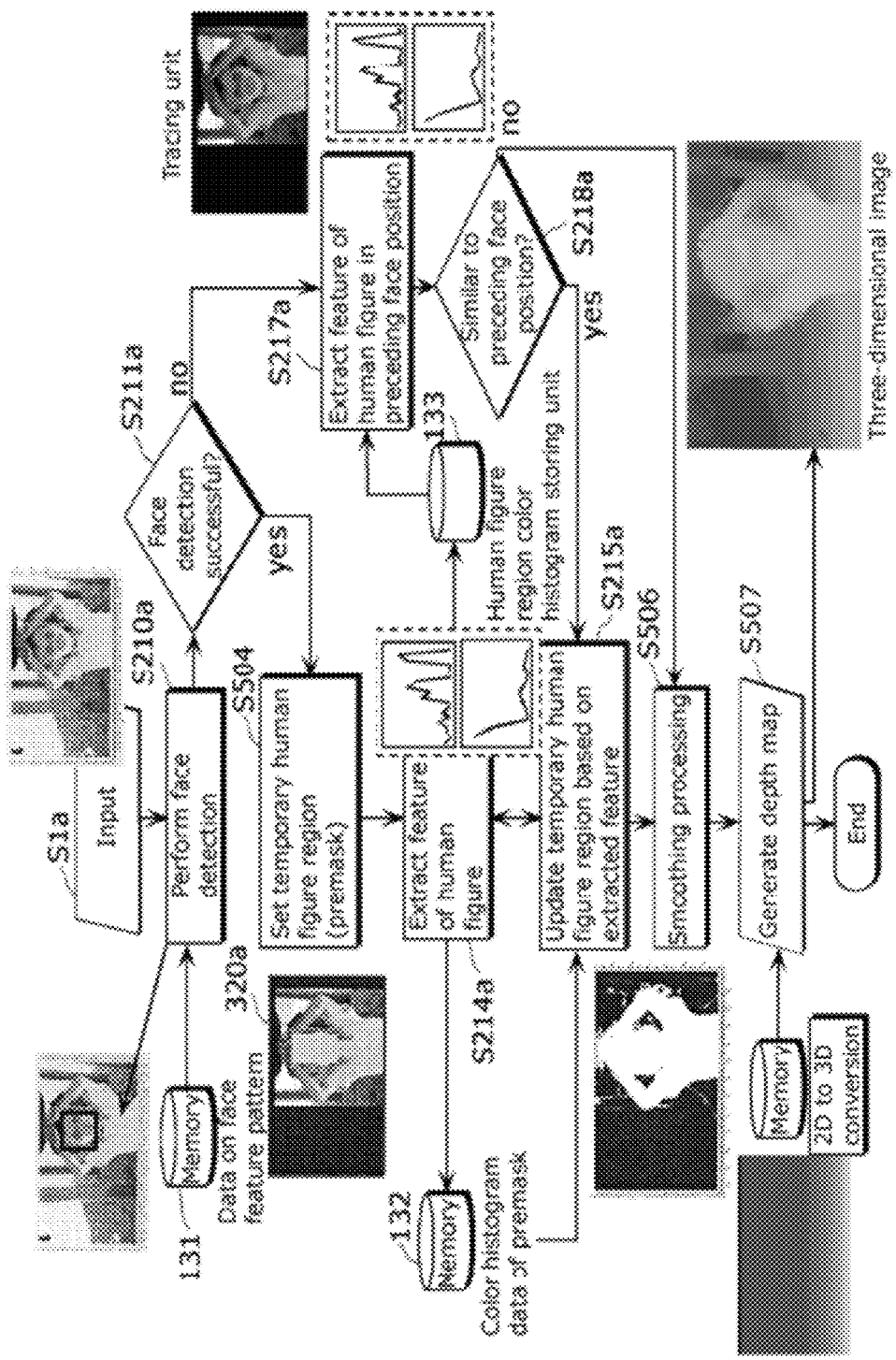
FIG. 25 is a drawing showing a flow of a processing in a depth information generating method according to the present invention.

FIG. 25 shows a summary of the depth information generating method according to the present invention. The respective components have been described above, and the description thereof will be omitted. As shown in FIG. 25, the depth map can be automatically and properly generated from a content in any unknown two-dimensional image.

As above, the depth information generating device, depth information generating method, and stereo image converter according to the present invention have been described using the embodiment, but the present invention will not be limited to the embodiment. The scope of the present invention includes those in which a variety of modifications conceived by persons skilled in the art is applied to the present embodiment, and embodiments including components in different embodiments in combination without departing from the spirit of the present invention.

The present invention can be used in a depth information generating device, a depth information generating method, and a stereo image converter in which depth information in a two-dimensional image (2D image) (hereinafter, referred to as a depth map) is generated, and using the generated depth map, a stereo image such as a three-dimensional image and a multiview image is generated.

REFERENCE SIGNS LIST

1 Depth information generating device
1A Minimal component unit
2, 3 Three-dimensional video generating device
10 Region extracting unit
11 Depth map generating unit
12 Smoothing processing unit
13, 131, 132, 132a, 132b, 133, 134, 135, 136 Memory
14 Rendering unit
15 Receiving unit
103 Human figure region determining unit
104 Feature extracting unit
105 Region adjusting unit
106 Region determining unit
320, 450, 460 Temporary human figure region
325 Boundary shape
330 Upper portion
335, 345 Lower portion
340, 350, 430, 470 Human figure region
355 Human figure region depth map
360, 370 Background depth information
410, 440, 610, 615, 910 Preceding frame
420, 625 Target frame
540, 550, 560 Histogram
600 Three-dimensional image grid
620, 810 Two-dimensional image
640, 645, 650, 655 Node
665 Pixel
820 Background plane
830 Hair plane
840 Coach plane
850 Skin plane
860 Color model planes
870, 875, 880, 885, 890 Color model plane
1011 Disk drive
1012 Tuner
1013 Network communication interface
1014 Memory device interface
1015 Data communication interface
1016 Buffer memory
1017 HD drive
1018 LSI
1019 Flash memory
1081 CPU
1082 Stream controller
1083 Decoder
1084 AV input output circuit
1085 System bus
1086 Memory controller

The invention claimed is:

1. A depth information generating device comprising:
a non-transitory memory device storing a program; and
a hardware processor configured to execute the program and cause the depth information generating device to operate as:
a region extracting unit configured to detect a human face region in at least one two-dimensional image, and extract a human figure region using a human figure premask selected based on a position of the detected human face region and that includes the detected human face region, the size of the human figure premask being changed according to a size of the detected human face region and being selected among a plurality of human figure premasks which are a plurality of pieces of data on a face feature pattern and a plurality of pieces of region data of a human model stored in a memory in advance, the human figure region indicating the human figure within a region in the at least one two-dimensional image; and
a generating unit configured to generate a depth map for separating the human figure region from a region other than the human figure region by giving a depth value different from a depth value of the region other than the human figure region to the human figure region,
wherein the human figure premask includes a face region that is the human face region, and a body region that is a region other than the face region.

2. The depth information generating device according to claim 1,
wherein the region extracting unit includes:
a detecting unit configured to detect the human face region in the at least one two-dimensional image;
a temporary region setting unit configured to set the human figure premask having the human face region matching with the detected human face region as a temporary human figure region; and
a human figure region determining unit configured to determine the human figure region based on a feature of the temporary human figure region and a feature of a pixel adjacent to the temporary human figure region.

3. The depth information generating device according to claim 2,
wherein the human figure region determining unit includes:
a feature extracting unit configured to extract the feature within the temporary human figure region and a feature of a pixel adjacent to the temporary human figure region;
a region adjusting unit configured to adjust a range of the temporary human figure region, based on the feature of the temporary human figure region and the feature of the pixel adjacent to the temporary human figure region extracted by the feature extracting unit; and
a region determining unit configured to determine the range of the temporary human figure region adjusted by the region adjusting unit, as the human figure region.

4. The depth information generating device according to claim 3,
wherein the feature extracting unit includes:
a histogram calculating unit configured to calculate a color histogram within the temporary human figure region as the feature of the temporary human figure region;
a pixel selecting unit configured to select a pixel adjacent to the temporary human figure region; and
a color information calculating unit configured to calculate color information on the pixel selected by the pixel selecting unit, as the feature of the pixel adjacent to the temporary human figure region.

5. The depth information generating device according to claim 3,
wherein the region adjusting unit includes:
a comparing unit configured to compare the color information on the pixel calculated by the color information calculating unit with the color histogram calculated by the histogram calculating unit; and
a region range updating unit configured to determine that the pixel is included in the human figure region and update the temporary human figure region to enlarge the range of the temporary human figure region, when a color of the pixel is a color included in the color histogram calculated by the histogram calculating unit; and determine that the pixel is not included in the human figure region and not to update the temporary human figure region, when the color of the pixel is not a color included in the color histogram.

6. The depth information generating device according to claim 2, wherein the generating unit includes:

a giving unit configured to calculate a first depth value of the human figure region extracted by the region extracting unit, based on a size and position of the human face region detected by the detecting unit in the at least one two-dimensional image, and give the calculated first depth value to the human figure region; and a synthesizing unit configured to synthesize a second depth value given to the temporary human figure region set by the temporary region setting unit with the first depth value, to generate a depth map that separates the human figure region from the region other than the human figure region.

7. The depth information generating device according to claim 1, further comprising a smoothing processing unit configured to smooth an edge of the human figure region in the depth map generated by the generating unit, using information on the at least one two-dimensional image.

8. The depth information generating device according to claim 7, wherein the smoothing processing unit is configured to smooth the edge of the human figure region in the depth map by spatially filtering the depth map, using the at least one two-dimensional image and the depth map generated by the generating unit, based on a weight function calculated based on a pixel intensity of the at least one two-dimensional image.

9. The depth information generating device according to claim 7, wherein the smoothing processing unit is configured to smooth the edge of the human figure region in the depth map by spatially and temporally filtering the depth map, using a target frame and a preceding frame in the two-dimensional images and the depth map generated by the generating unit, based on a weight function calculated based on pixel intensities of image data on the target frame and the preceding frame and a difference between the pixel intensities.

10. A stereo image converter comprising:

the depth information generating device according to claim 1; and a rendering unit configured to convert the at least one two-dimensional image to a stereo image corresponding to the at least one two-dimensional image using the depth map generated by the depth information generating device.

11. A computer implemented depth information generating method comprising:

detecting by the computer a human face region in at least one two-dimensional image, and extracting a human figure region using a human figure premask selected based on a position of the detected human face region and that includes the detected human face region, the size of the human figure premask being changed according to a size of the detected human face region and being selected among a plurality of human figure premasks which are a plurality of pieces of data on a face feature pattern and a plurality of pieces of region data of a human model stored in a memory in advance, the human figure region indicating a human figure within a region of the at least one two-dimensional image; and generating a depth map for separating the human figure region from a region other than the human figure region by giving a depth value different from a depth value of the region other than the human figure region to the human figure region, wherein the human figure premask includes a face region that is the human face region, and a body region that is a region other than the face region.

* * * * *